(12) United States Patent
Kelly et al.

(10) Patent No.: US 11,148,567 B2
(45) Date of Patent: Oct. 19, 2021

(54) ARMREST ASSEMBLY WITH SELF-LEVELING CAPABILITY

(71) Applicant: Lear Corporation, Southfield, MI (US)

(72) Inventors: Alan Kelly, Telford (GB); Carl Penn, Birmingham (GB)

(73) Assignee: Lear Corporation, Southfield, MI (US)

( * ) Notice: Subject to any disclaimer, the term of this patent is extended or adjusted under 35 U.S.C. 154(b) by 97 days.

(21) Appl. No.: 16/222,108

(22) Filed: Dec. 17, 2018

(65) Prior Publication Data

US 2020/0189432 A1  Jun. 18, 2020

(51) Int. Cl.
*B60N 2/75* (2018.01)
*B60N 2/90* (2018.01)
*B60N 2/22* (2006.01)

(52) U.S. Cl.
CPC .............. *B60N 2/767* (2018.02); *B60N 2/22* (2013.01); *B60N 2/757* (2018.02); *B60N 2/933* (2018.02); *B60N 2002/924* (2018.02)

(58) Field of Classification Search
CPC ........ B60N 2/767; B60N 2/933; B60N 2/757; B60N 2/753; B60N 2/22; B60N 2/787; A47C 7/543
USPC ........................................ 297/411.39, 411.26
See application file for complete search history.

(56) References Cited

U.S. PATENT DOCUMENTS

| | | | |
|---|---|---|---|
| 3,666,319 A | 5/1972 | Moloney, Jr. | |
| 4,118,069 A * | 10/1978 | Hunter | A47C 7/543 297/411.29 |
| 4,881,778 A | 11/1989 | Stephenson et al. | |
| 4,968,095 A * | 11/1990 | Moyer | A47C 1/03 297/411.39 |
| 4,978,170 A * | 12/1990 | Pelz | B60N 2/767 297/411.39 |
| 6,361,114 B1 | 3/2002 | Rumler | |
| 8,328,286 B2 | 12/2012 | Steury et al. | |
| 8,967,722 B2 | 3/2015 | Neterer et al. | |
| 9,108,549 B2 | 8/2015 | Thurow | |
| 10,227,027 B2 * | 3/2019 | Edwards | B60N 2/206 |
| 2018/0015854 A1 * | 1/2018 | Song | B60N 2/22 |

FOREIGN PATENT DOCUMENTS

| | | | | |
|---|---|---|---|---|
| DE | 3814758 A1 | 11/1989 | | |
| DE | 102018209328 A1 * | 12/2019 | ............. | B60N 2/309 |
| FR | 2728841 A1 | 7/1996 | | |
| GB | 1464502 A * | 2/1977 | ............... | A47C 5/06 |
| JP | 2009285193 A | 12/2009 | | |
| WO | 2016050827 A1 | 4/2016 | | |

* cited by examiner

*Primary Examiner* — Milton Nelson, Jr.
(74) *Attorney, Agent, or Firm* — MacMillan, Sobanski & Todd, LLC

(57) ABSTRACT

A self-leveling armrest assembly for a vehicle is provided. The self-leveling armrest assembly includes a back portion of a vehicle seat having a first bracket and a second bracket. The second bracket is rotatably connected to at least one floor bracket. An armrest assembly is rotatably connected to the first bracket of the back portion. At least one motion link is rotatably connected to the second bracket of the back portion. The at least one motion link is configured to receive a portion of the armrest assembly as the armrest assembly rotates. The motion link is configured to maintain the armrest assembly in a substantially horizontal orientation.

6 Claims, 15 Drawing Sheets

ARMREST ASSEMBLY WITH SELF-LEVELING CAPABILITY

BACKGROUND

Transportation devices, such as the non-limiting example of sport utility vehicles, can include one or more seats for supporting occupants thereon during use. A typical vehicle seat includes a seat portion and a back portion, each of which includes a structural frame having occupant supporting and cushioning features provided therein.

The seat portion and the back portion can be pivotally attached, enabling the seat portion and the back portion to assume differing positions, thereby making the vehicle seat comfortable for the occupant. In certain instances, the vehicle seat can have one or more reclined positions, that is, the back portion can be orientated at an acute angle relative to a horizontal line.

The vehicle seat can include armrest assemblies for the comfort of vehicle occupants. Often, such as in vehicles having a bench-type seat, the armrest assemblies can be moved between a lowered deployed position and a raised stowed position. In the deployed position, the armrest assembly can be positioned in a substantially horizontal orientation adjacent to a bottom portion of the seat for use by occupants of the seat located on either side of the armrest assembly. In the stowed position, the armrest assembly is positioned adjacent to the back portion of the seat such that a center portion of the seat is available for use, such as by a third occupant of the seat, for example.

Ideally, the armrest assembly is positioned in a level orientation when deployed. However, because a typical armrest assembly is attached to the back portion of the vehicle seat, the orientation of the armrest assembly can change concurrent with the orientation of the back portion of the vehicle seat. Accordingly, as the back portion of the vehicle seat reclines, so does the armrest assembly. The orientation change of the armrest assembly may result in discomfort to the occupant.

It would be desirable to provide an improved armrest assembly having structural capable of maintaining a level orientation when deployed, regardless of a change in orientation of the back portion of the vehicle seat.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the armrest assembly with self-leveling capability.

The above objects as well as other objects not specifically enumerated are achieved by a self-leveling armrest assembly for a vehicle. The self-leveling armrest assembly includes a back portion of a vehicle seat having a first bracket and a second bracket. The second bracket is rotatably connected to at least one floor bracket. An armrest assembly is rotatably connected to the first bracket of the back portion. At least one motion link is rotatably connected to the second bracket of the back portion. The at least one motion link is configured to receive a portion of the armrest assembly as the armrest assembly rotates. The motion link is configured to maintain the armrest assembly in a substantially horizontal orientation.

The above objects as well as other objects not specifically enumerated are also achieved by a self-leveling armrest assembly for a vehicle. The self-leveling armrest assembly includes a back portion of a vehicle seat having a first bracket and a second bracket. The second bracket is rotatably connected to at least one floor bracket. An armrest assembly is rotatably connected to the first bracket of the back portion. An actuator assembly is connected to the second bracket of the back portion and a rocker assembly is connected to the actuator assembly and to the armrest assembly. The actuator assembly causes rotation of the rocker assembly to maintain the armrest assembly in a substantially horizontal orientation.

Various aspects of the armrest assembly with self-leveling capability will become apparent to those skilled in the art from the following detailed description of the illustrated embodiments, when read in light of the accompanying drawings.

DETAILED DESCRIPTION

The armrest assembly with self-leveling capability will now be described with occasional reference to specific embodiments. The armrest assembly with self-leveling capability may, however, be embodied in different forms and should not be construed as limited to the embodiments set forth herein. Rather, these embodiments are provided so that this disclosure will be thorough and complete, and will fully convey the scope of the armrest assembly with self-leveling capability to those skilled in the art.

Unless otherwise defined, all technical and scientific terms used herein have the same meaning as commonly understood by one of ordinary skill in the art to which the armrest assembly with self-leveling capability belongs. The terminology used in the description of the armrest assembly with self-leveling capability is for describing particular embodiments only and is not intended to be limiting of the armrest assembly with self-leveling capability. As used in the description of the armrest assembly with self-leveling capability and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in the embodiments of the armrest assembly with self-leveling capability.

Notwithstanding that the numerical ranges and parameters setting forth the broad scope of the armrest assembly with self-leveling capability are approximations, the numerical values set forth in the specific examples are reported as precisely as possible. Any numerical values, however, inherently contain certain errors necessarily resulting from error found in their respective measurements.

Figure 1:
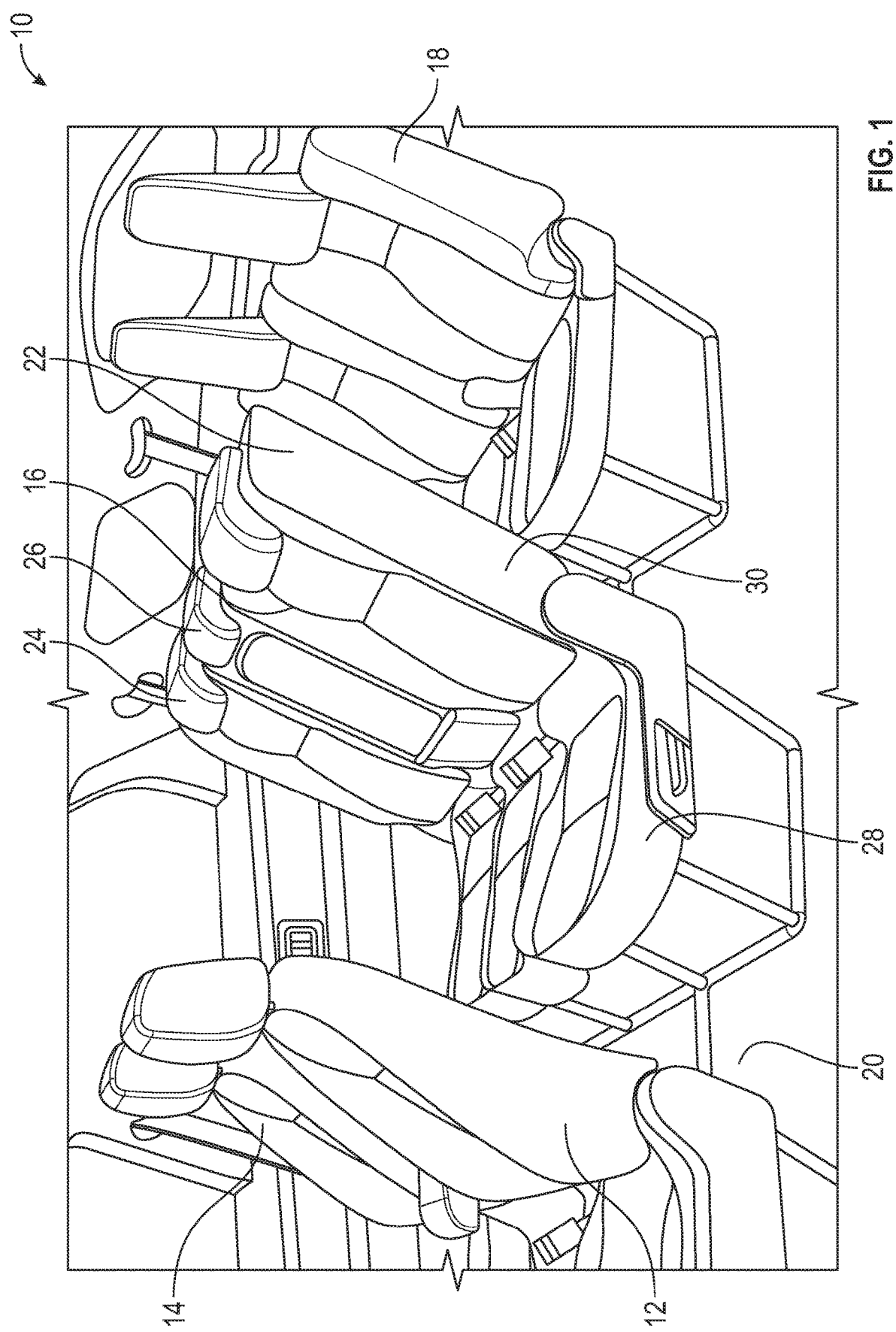
FIG. 1 is a perspective side view of a cabin of a vehicle, the cabin including a plurality of rear seats having an armrest assembly therebetween.

Referring now to the drawings, there is illustrated in FIG. 1 a compartment or cabin of a vehicle, indicated generally at 10. The term "cabin" as used herein, is defined to mean a space defining an interior of the vehicle. While the embodiment shown in FIG. 1 illustrates a cabin of a typical sport utility vehicle, it is contemplated that the armrest assembly with self-leveling capability can be incorporated into other vehicles, including the non-limiting examples of sedans, trucks, airplanes, boats, trains and the like.

Referring again to FIG. 1, the cabin 10 includes a plurality of front seats 12, 14 and a plurality of rear seats 16, 18. The seats 12, 14, 16 and 18 are mounted to a vehicle floor 20 as is conventional in the art.

Referring again to FIG. 1, the rear seat 16 includes a first seat assembly 22, a second seat assembly 24 and an armrest assembly 26 positioned therebetween. The first seat assembly 22 is representative of the second seat assembly 24 and includes a seat portion 28 and a back portion 30 (also commonly called a squab). The squab 30 is pivotally attached to the seat portion 28 and is configured for rotation to several different orientations, as will be discussed in detail below. The seat portion 28 and the squab 30 may each include internal frames configured to support an occupant, cushioning features supported on the respective internal frames, and one or more trim materials configured to cover the internal frames and the cushioning features.

Referring again to FIG. 1, the armrest assembly 26 is pivotally attached to the squab 30 and is configured for rotation to several different orientations. The armrest assembly 26 may include an internal frame, cushioning features supported on the internal frame and one or more trim materials covering the internal frame and the cushioning features.

Figure 2:
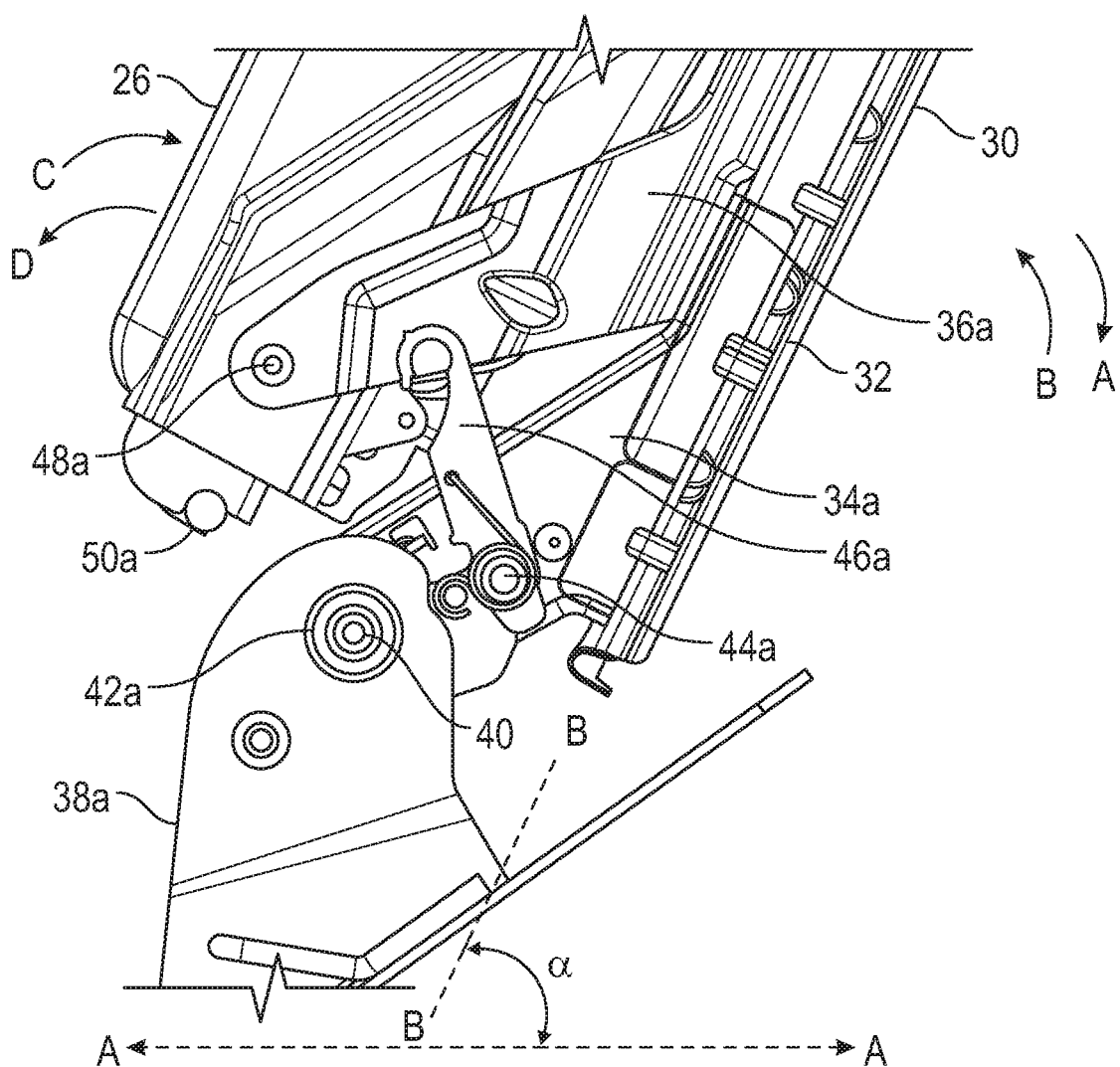
FIG. 2 is a side view of an armrest assembly and a squab of one of the rear seats of FIG. 1, with the armrest assembly positioned in a stowed orientation.

Referring now to FIG. 2, the armrest assembly 26 and the squab 30 are shown with the armrest assembly 26 in a stowed orientation and the squab 30 in a first reclined orientation. In these orientations, the armrest assembly 26 is rotated such that a portion of the armrest assembly 26 seats against the squab 30, which has a sloped arrangement relative to horizontal line A-A.

Referring again to FIG. 2, the squab 30 includes an internal frame 32, opposing first brackets 34a, 34b and opposing second brackets 36a, 36b (only one of each of the first and second brackets 34a, 36a is shown in FIG. 2 for purposes of clarity). The opposing first brackets 34a, 34b extend in a direction toward opposing floor brackets 38a, 38b (only one of the floor brackets 38a is shown in FIG. 2 for purposes of clarity).

Referring again to FIG. 2, a shaft 40 is connected to the opposing first brackets 34a, 34b and is received by bearings 42a, 42b positioned in the opposing floor brackets 38a, 38b. In operation, the shaft 40 and the connected squab 30 are configured to rotate as a unit relative to the opposing floor brackets 38a, 38b in a clockwise direction, indicated by direction arrow A, as well as a counter clockwise direction, indicated by direction arrow B.

Referring again to FIG. 2, each of the opposing first brackets 34a, 34b includes a first pin 44a, 44b. The first pins 44a, 44b extend in substantially perpendicular directions away from the opposing first brackets 34a, 34b and are configured to receive motion link assemblies 46a, 46b (only one of the first pins 44a and motion link assemblies 46a are shown in FIG. 2 for purposes of clarity). The motion link assemblies 46a, 46b are configured for rotation about the first pins 44a, 44b. The motion link assemblies 46a, 46b will be discussed in more detail below.

Referring again to FIG. 2, each of the opposing second brackets 36a, 36b includes a second pin 48a, 48b. The second pins 48a, 48b extend in substantially perpendicular directions away from the opposing second brackets 36a, 36b and are configured to support the armrest assembly 26 for rotation about the second pins 48a, 48b. In operation, the armrest assembly 26 is configured to rotate relative to the opposing second brackets 36a, 36b in a clockwise direction, indicated by direction arrow C, as well as a counter clockwise direction, indicated by direction arrow D.

Referring again to FIG. 2, a lower portion of the armrest assembly 26 includes third pins 50a, 50b. The third pins 50a, 50b extend in substantially perpendicular directions away from the armrest assembly 26 and, as will be explained in more detail below, are configured to engage respective portions of the motion link assemblies 46a, 46b.

Figure 3:
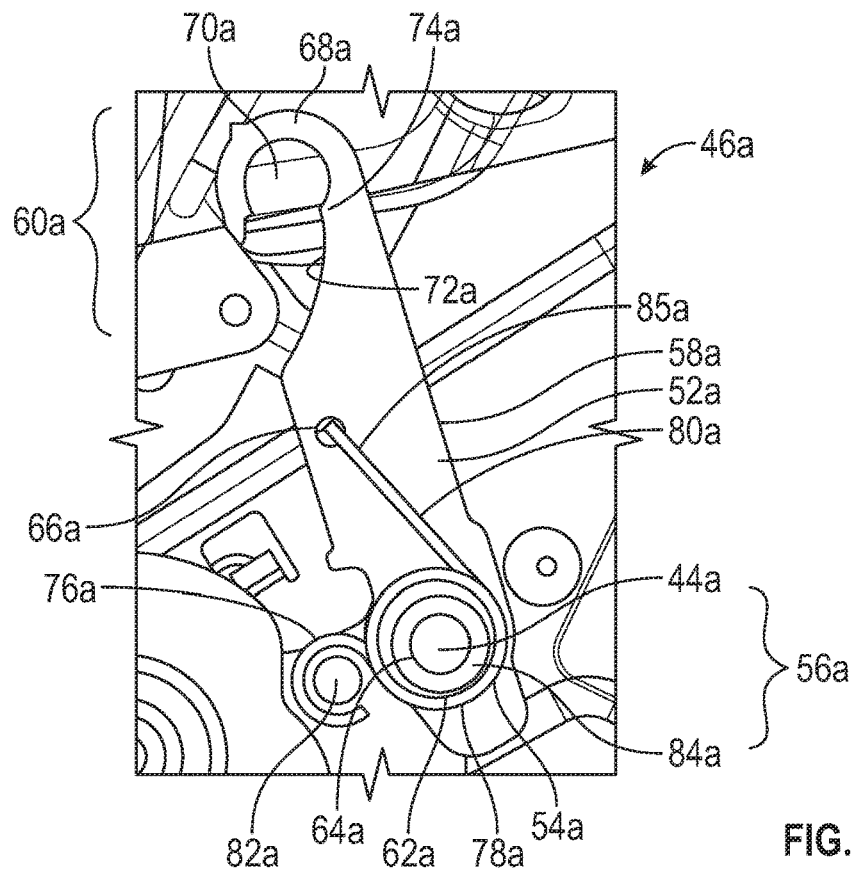
FIG. 3 is a side view of a motion link assembly of the armrest assembly of FIG. 2.

Referring now to FIG. 3, the motion link assembly 46a is illustrated. The motion link assembly 46a is representative of the motion link assembly 46b. The motion link assembly 46a includes a motion link 52a and a link spring 54a. The motion link 52a includes a lower portion 56a, an intermediate portion 58a and an upper portion 60a. The lower portion 56a includes a hub 62a having an aperture 64a. The aperture 64a is configured to receive the first pin 44a in a manner such that the motion link 52a is rotatable about the first pin 44a. The hub 62a is configured to receive a portion of the link spring 54a, as will be described in more detail below.

Referring again to FIG. 3, the intermediate portion 58a of the motion link 52a includes a link aperture 66a. The link aperture 66a is configured to receive a portion of the link spring 54a, as will be described in more detail below.

Referring again to FIG. 3, the upper portion 60a of the motion link 52a includes an arcuate segment 68a. The arcuate segment 68a forms a recess 70a therein. In the embodiment shown in FIG. 3, the recess 70a has the cross-sectional shape of a "C", with the opening of the "C" facing in a generally downward direction. The recess 70a, formed by the arcuate segment 68a of the upper portion 60a is configured to receive the third pin 50a as the armrest assembly 26 rotates, as will be described in more detail below.

Referring again to FIG. 3, a guide segment 72a is provided on the upper portion 60a of the motion link 52a and extends from the arcuate segment 68a to the intermediate portion 58a. In the illustrated embodiment, the guide segment 72a has a narrowing cross-section shape configured to slidably receive the third pin 50a and urge the third pin 50a in the direction of the recess 70a as the armrest assembly 26 rotates. However, it should be appreciated that in other embodiments, the guide segment 72a can have other configurations sufficient to slidably receive the third pin 50a and urge the third pin 50a in the direction of the recess 70a as the armrest assembly 26 rotates Referring again to FIG. 3, a detent 74a is positioned between the arcuate segment 68a and the guide segment 72a. The detent 74a is configured as a snap retention mechanism to maintain the third pin 50a within the recess 70a formed by the arcuate segment 68a. While the embodiment illustrated in FIG. 3 includes the detent 74a, it is contemplated that in other embodiments, other structures, mechanisms and devices can be used as a snap retention mechanism to maintain the third pin 50a within the recess 70a formed by the arcuate segment 68a.

Referring again to FIG. 3, the link spring 54a includes a first segment 76a, a second segment 78a and a third segment 80a. The first segment 76a has an arcuate form and is configured to seat on a projection 82a in a manner such as to prevent the link spring 54a from rotation. In the illustrated embodiment, the arcuate form of the first segment 76a corresponds to a circular cross-sectional shape of the projection 82a. However, in other embodiments, the first segment 76a and the projection 82a can have other desired shapes, sufficient to prevent rotation of the link spring 54a.

Referring again to FIG. 3, the second segment 78a of the link spring 54a extends from the first segment 76a and has the form of a coil. The coil-shaped second segment 78a forms an aperture 84a. The aperture 84a is configured to receive the hub 62a of the lower portion 56a of the motion link 46a in a manner such that the coil-shaped second segment 78a wraps around the hub 62a. In this manner, the coil-shaped second segment 78a is configured to provide a tension force to the third segment 80a.

Referring again to FIG. 3, the third segment 80a extends from the second segment 78a and has the form of a substantially straight member. The third segment 80a has a distal end 85a, configured for contact with the link aperture 66a of the intermediate portion 58a of the motion link 46a. As will be explained in more detail below, in operation the third segment 80a of the link spring 54a is configured to provide a force to maintain contact of the motion link 46a with the third pin 50a of the armrest assembly 26.

As described above and referring now to FIG. 2, the armrest assembly 26 and the squab 30 are shown with the armrest assembly 26 in a stowed orientation and the squab 30 in a first reclined orientation. The term "first reclined orientation", as used herein, is defined to mean a longitudinal axis B-B of the squab 30 forms a first acute angle α with the horizontal line A-A. In the illustrated embodiment, the first acute angle α is in a range of from about 65° to about 75°. However, in other embodiments, the first acute angle α can be less than about 65° or more than about 75°. With the armrest assembly 26 and the squab 30 in these relative positions, the arcuate segment 68a of the motion link 46a is spaced apart from the third pin 50a of the armrest assembly 26.

Figure 4:
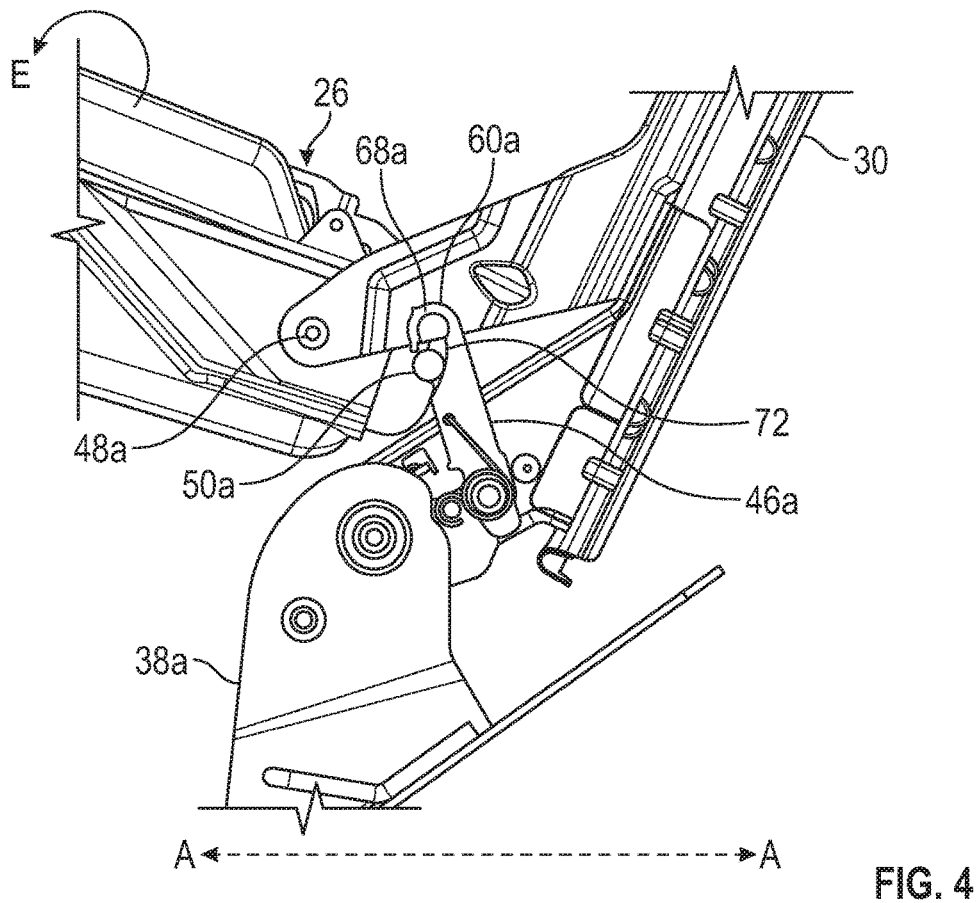
FIG. 4 is a side view of the motion link assembly of FIG. 2, shown with the armrest assembly rotating to a horizontal orientation and the squab in a first reclined orientation.

Referring now to FIG. 4, the squab 30 remains in a first reclined orientation relative to horizontal line A-A and the armrest assembly 26 is rotated in a forward direction about the second pin 48a, as indicated by direction arrow E. As the armrest assembly 26 is rotated in the forward direction, the third pin 50a of the armrest assembly 26 contacts the guide segment 72a of the upper portion 60a of the motion link 46a. The guide segment 72a is configured to direct the travel of the third pin 50a in a direction toward the arcuate segment 68a of the upper portion 60a of the motion link 46a. As the third pin 50a contacts the guide segment 72a, the contact of the third segment 80a of the link spring 54a against the link aperture 66a provides resistance against rotation of the motion link 46a.

Figure 5:
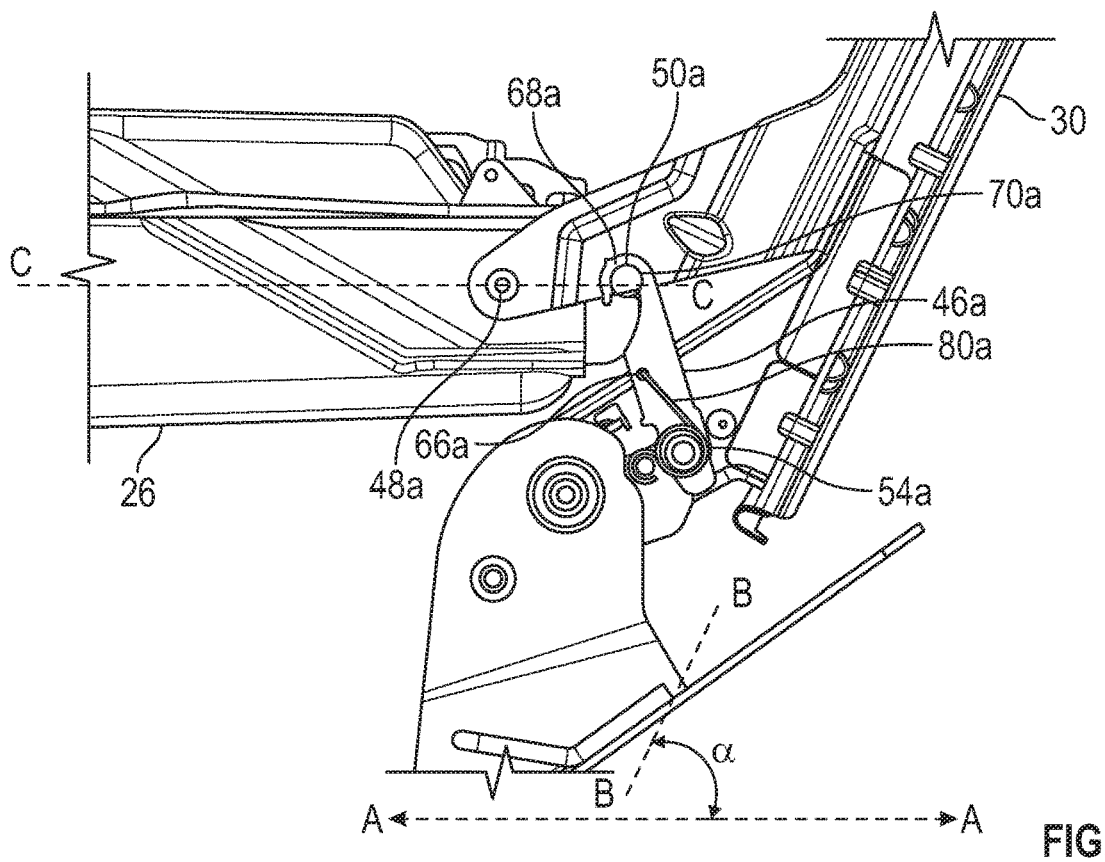
FIG. 5 is a side view of the motion link assembly of FIG. 2, shown with the armrest assembly positioned in a horizontal orientation and the squab in a first reclined orientation.

Referring now to FIG. 5, the squab 30 remains in a first reclined orientation relative to horizontal line A-A and the armrest assembly 26 is rotated in a forward direction about the second pin 48a to a substantially horizontal orientation as the link spring 54a provides resistance against rotation of the motion link 46a. The term "substantially horizontal orientation", as used herein, as defined to mean a longitudinal axis C-C of the armrest assembly 26 is substantially parallel to the horizontal line A-A. In the substantially horizontal position, the third pin 50a of the armrest assembly 26 seats within the recess 70a formed by the arcuate segment 68a of the upper portion 60a of the motion link 46a. In this manner, the third pin 50a and the motion link 46a cooperate to allow the armrest assembly 26 to rotate to the substantially horizontal orientation and further cooperate to maintain the armrest assembly 26 in the horizontal orientation.

Figure 6:
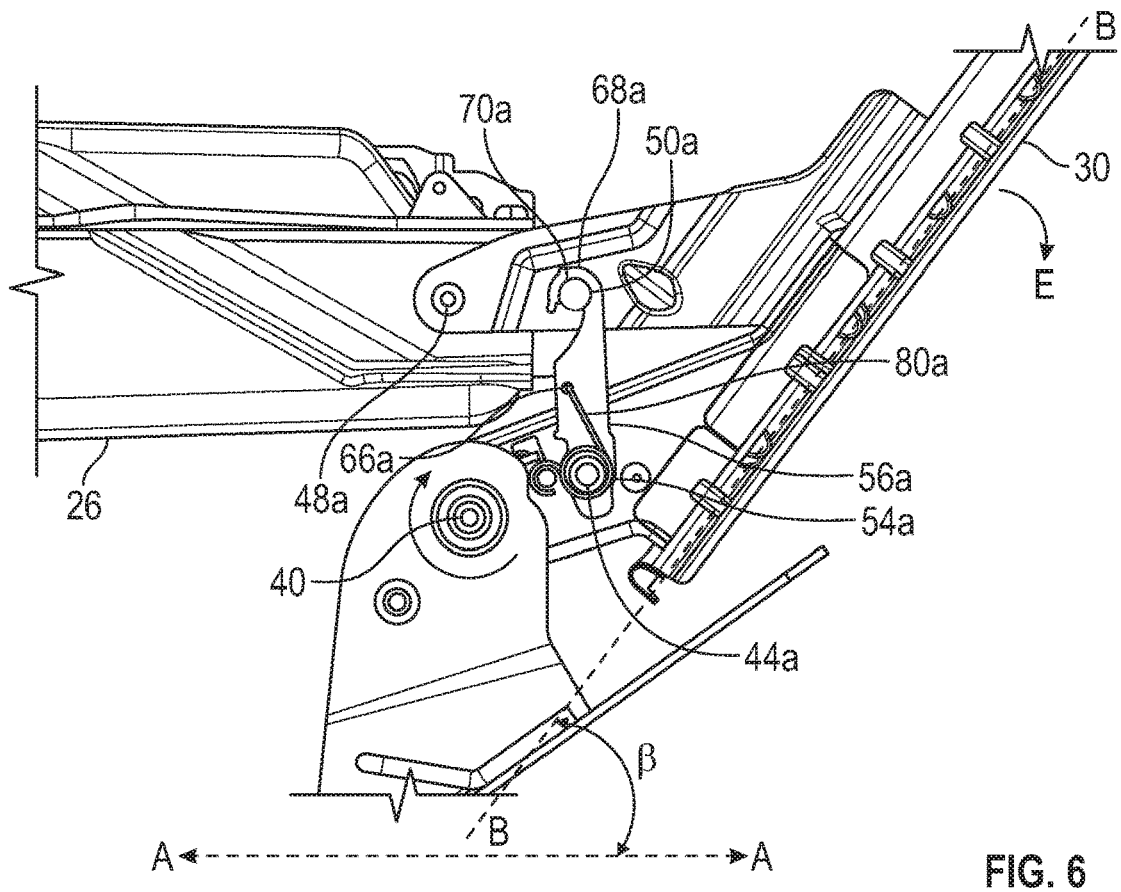
FIG. 6 is a side view of the motion link assembly of FIG. 2, shown with the armrest assembly positioned in a horizontal orientation and the squab in a second reclined orientation.

While the embodiments shown in FIGS. 2 and 3 show the squab 30 in a first reclined orientation, it is contemplated that the motion link 46a can be used to maintain the armrest assembly 26 in the substantially horizontal orientation with the squab 30 in other reclined orientations. Referring now to FIG. 6, the squab 30 is shown after rotation about the second pin 48a (as shown by direction arrow E) to a second reclined orientation. In the second reclined orientation, the longitudinal axis B-B of the squab 30 forms a second acute angle β with the horizontal line A-A. In the illustrated embodiment, the second acute angle β is less than the first acute angle α and in a range of from about 45° to about 60°. However, in other embodiments, the second acute angle β can be less than about 45° or more than about 60°.

Referring again to FIG. 6, as the squab 30 rotates on the shaft 40 in direction E, the third pin 50a remains seated in the recess 70a formed by the arcuate segment 68a of the upper portion 60a of the motion link 46a. The lower portion 56a of the motion link 46a rotates about the first pin 44a until a longitudinal axis of the motion link 46a assumes a substantially vertical orientation. In this manner, advantageously the third pin 50a and the motion link 46a cooperate to allow the squab 30 to rotate to the second reclined orientation with the armrest assembly 26 maintaining the substantially horizontal orientation.

Figure 7:
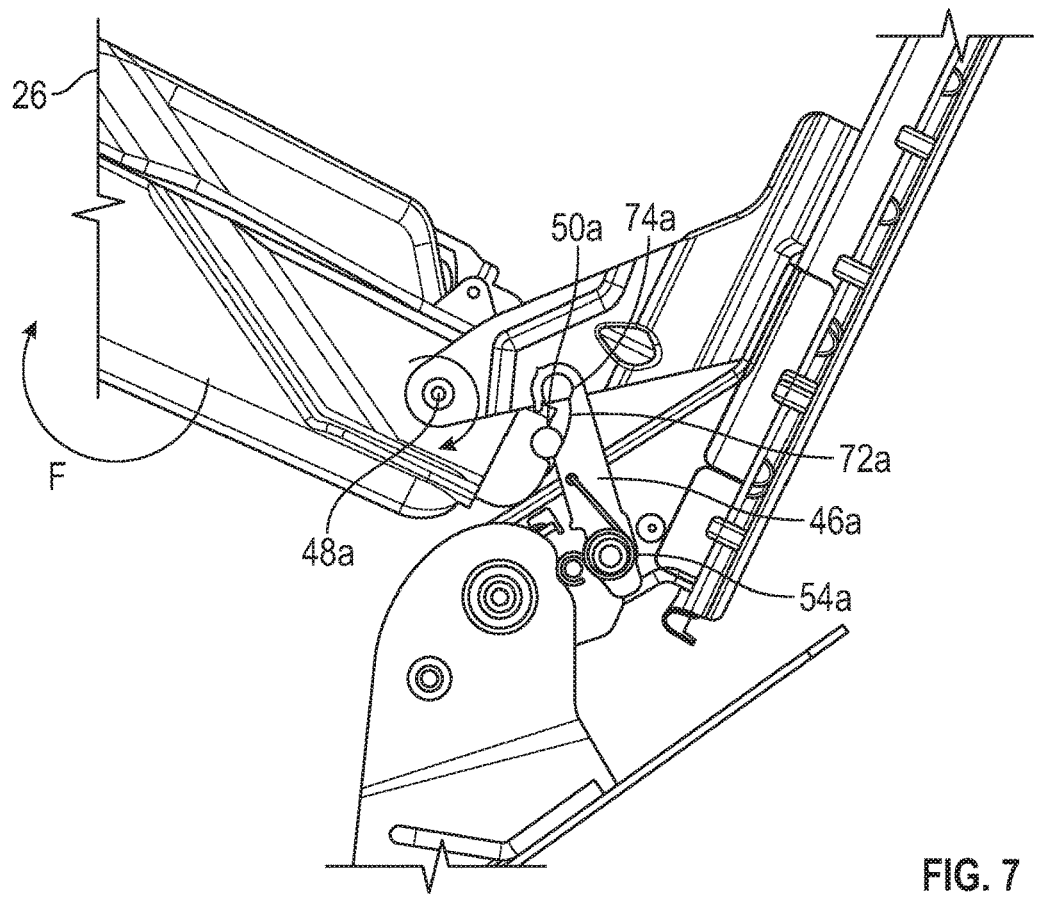
FIG. 7 is a side view of the motion link assembly of FIG. 2, shown with the armrest assembly disengaging with the motion and the squab in a first reclined orientation.

Referring now to FIG. 7, the armrest assembly 26 can be returned to a stowed orientation by disengaging the armrest assembly 26 from the motion link 46a. Disengagement of the armrest assembly 26 from the motion link 46a is accomplished by clockwise rotation of the armrest assembly 26, as indicated by direction arrow F, about the second pin 48a. As the armrest assembly 26 is rotated, the third pin 50a overcomes the resistance of the detent 74a and is guided by the guide segment 72a of the motion link 46a. As the armrest assembly 26 continues to rotate in the clockwise direction, the motion link 46a is restrained from rotation by the link spring 54a. Continued rotation of the armrest assembly 26 separates the third pin 50a from the motion link 46a, thereby allowing the armrest assembly 26 to rotate to the stowed position as shown in FIG. 2.

Figure 8:
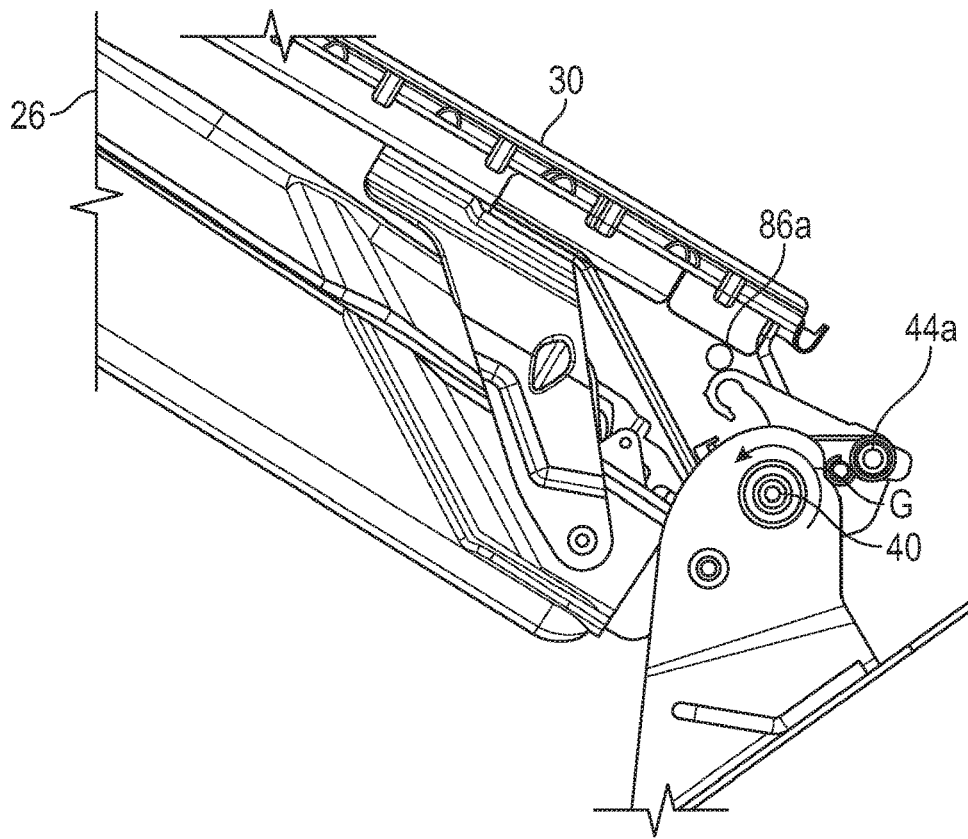
FIG. 8 is a side view of the motion link assembly, armrest assembly and squab of FIG. 2, shown rotating to a horizontal orientation.
Figure 9:
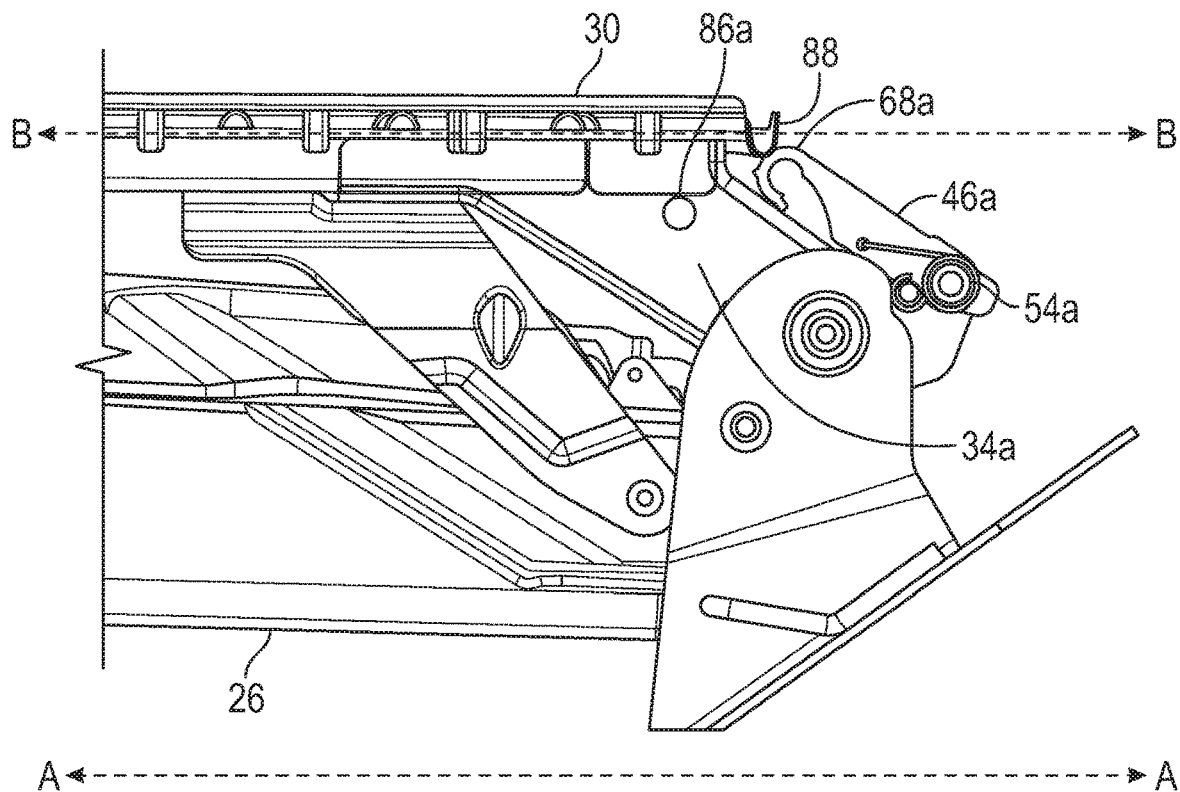
FIG. 9 is a side view of the motion link assembly, armrest assembly and squab of FIG. 2, shown positioned in a horizontal orientation.

While the embodiments shown in FIGS. 2 and 4-6 illustrate the squab 30 in a reclined orientation, it is contemplated that the squab 30 can be rotated to a forward orientation, also called a fold flat orientation. Referring now to FIGS. 8 and 9, operation of the squab 30 to a fold flat orientation will now be described. Referring first to FIG. 8, the armrest assembly 26 and the squab 30 are illustrated adjacent to each other. The squab 30 is rotated in a counterclockwise direction, as indicated by direction arrow G, about the shaft 40 extending through the floor brackets 38a, 38b. A stop pin 86a located on the first bracket 34a contacts the motion link 46a and urges the motion link 46a to rotate in the same counterclockwise direction, as indicated by direction arrow G, about the first pin 44a. As the motion link 46a rotates, the link spring 54a resists the counterclockwise rotation of the motion link 46a. As the motion link 46a continues to rotate, the link spring 54a becomes fully compressed against the projection 82a before the squab 30 achieves the fold flat orientation. The squab 30 is rotated further to achieve the fold flat orientation.

Referring now to FIG. 9, the armrest assembly 26 and the squab 30 are illustrated in the fold flat orientation. The term "fold flat orientation", as used herein, is defined to mean the longitudinal axis B-B of the squab 30 is substantially parallel with the horizontal line A-A. In the fold flat orientation, the armrest assembly 26 and the squab 30 are nested together. The arcuate segment 68a of the motion link 46a is in contact with an extension segment 88 extending from the squab 30. In this position, the motion link 46a is trapped against the first bracket 34a of the squab 30 by the extension segment 88 as the stop pin 86a has rotated out of contact with the motion link 46a, thereby allowing the motion link 46a to spring in an upward direction to contact the extension segment 88. In this position, the link spring 54a urges the motion link 46a into continued contact with the extension segment 88.

Figure 10:
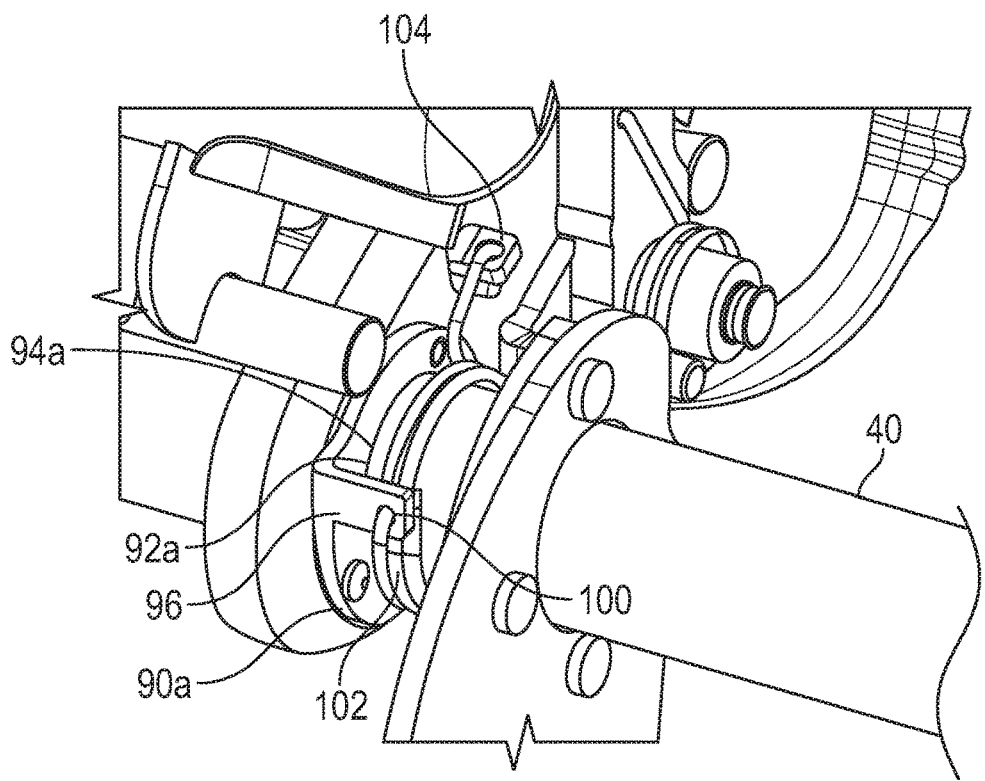
FIG. 10 is a perspective view of an optional link spring retainer and retainer spring of the armrest assembly of FIG. 2.
Figure 11:
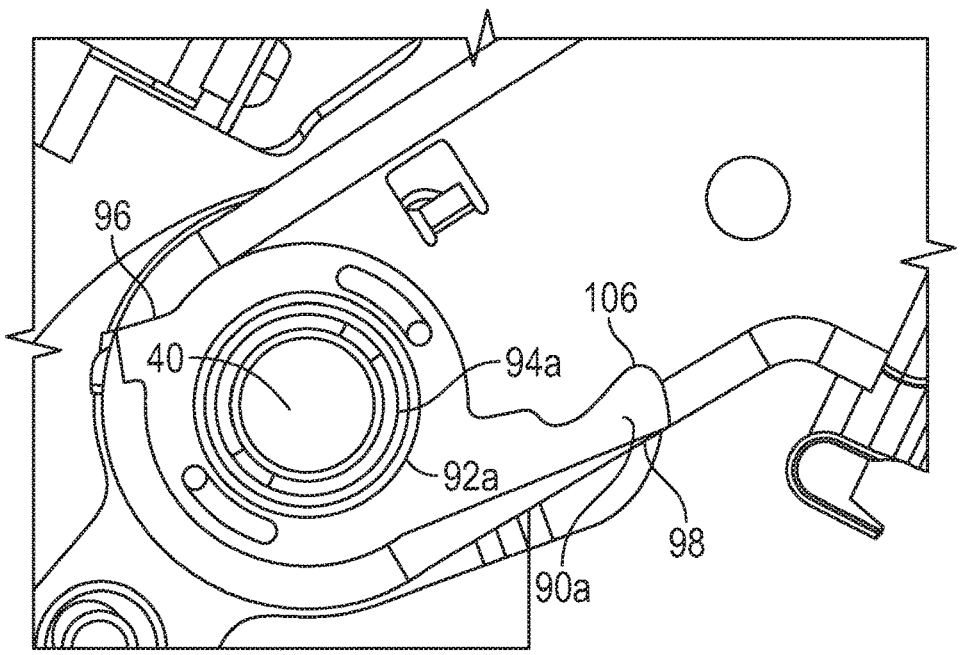
FIG. 11 is a side view of an optional link spring retainer of the armrest assembly of FIG. 2.

In certain instances, it may be desired to include additional structures to maintain the motion link 46a in a position apart from the squab 30 as the squab 30 is rotated to the fold flat orientation. Referring now to FIGS. 10 and 11, a link spring retainer 90a is illustrated. The link spring retainer 90a includes a hub 92a having an aperture 94a. The hub 92a is configured to engage the shaft 40, such that rotation of the shaft 40 results in rotation of the link spring retainer 90a. The link spring retainer 90a further includes a first arm 96 and a second arm 98. The first arm 96 includes an aperture 100, configured to receive a first end of a retainer spring 102. A second end of the retainer spring 102 is secured to a post 104. The retainer spring 102 is configured to resist rotation of the link spring retainer 90a as the shaft 40 rotates.

Referring again to FIGS. 10-12, the second arm 98 of the link spring retainer 90a extends from the hub 92a and includes a recess 106. In operation, as the armrest assembly 26 and the squab 30 are rotated to the fold flat orientation, the shaft 40 rotates in a counterclockwise direction. Rotation of the shaft 40 causes rotation of the hub 92a of the link spring retainer 90a and, in turn, rotation of the second arm 98. Rotation of the second arm 98 captures a pick-up feature 107 extending inwardly from the intermediate portion 58a of the motion link 46a, thereby holding the motion link 46a apart from the rotating squab 30. In the illustrated embodiment, the pick-up feature 107 is a nub. However, in other embodiments, the pick-up feature 107 can be other structures sufficient for capture by the second arm 98 of the link spring retainer 90a. The link spring retainer 90a maintains the motion link 46a apart from the squab 30 with the squab 30 in the fold flat orientation until the armrest assembly 26 and the squab 30 are rotated to inclined orientations, during which the motion link 46a is released from the link spring retainer 90a at a predetermined position. It is noted that the link spring retainer 90a is optional and may not be included if a fold flat orientation is not required.

Referring again to FIGS. 10 and 11, as the armrest assembly 26 and the squab 30 are rotated from the fold flat orientation to reclined orientations, rotation of the shaft 40 and the second arm 98 causes the second arm 98 to disengage the lower portions of the of the motion link 46a, thereby releasing the motion link.

Figure 12:
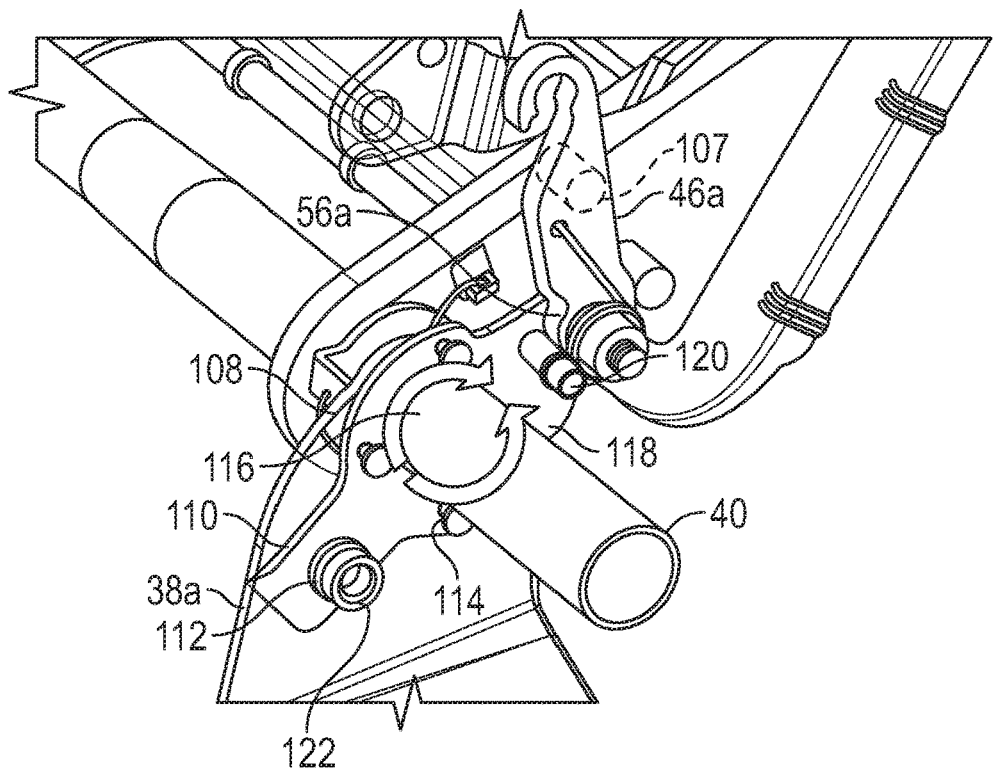
FIG. 12 is a perspective left side view of an optional motion link driver of the armrest assembly of FIG. 2.
Figure 13:
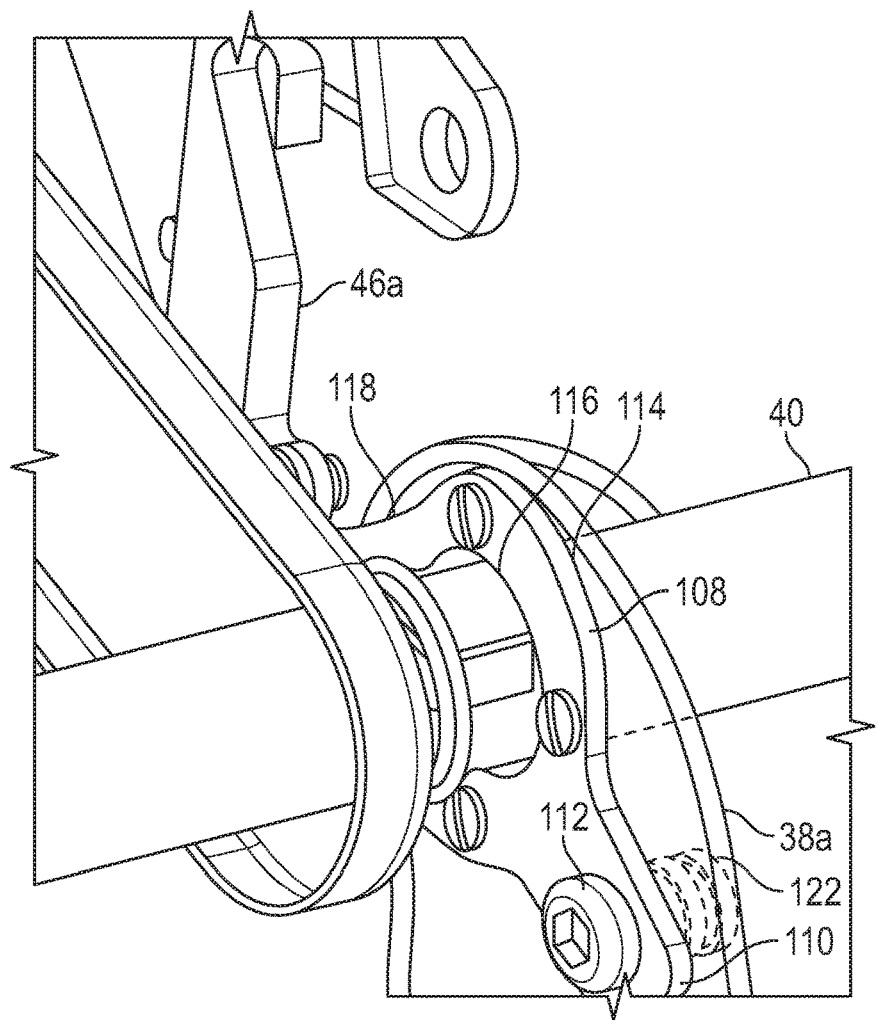
FIG. 13 is a perspective right side view of the optional motion link driver of the armrest assembly of FIG. 12.
Figure 14:
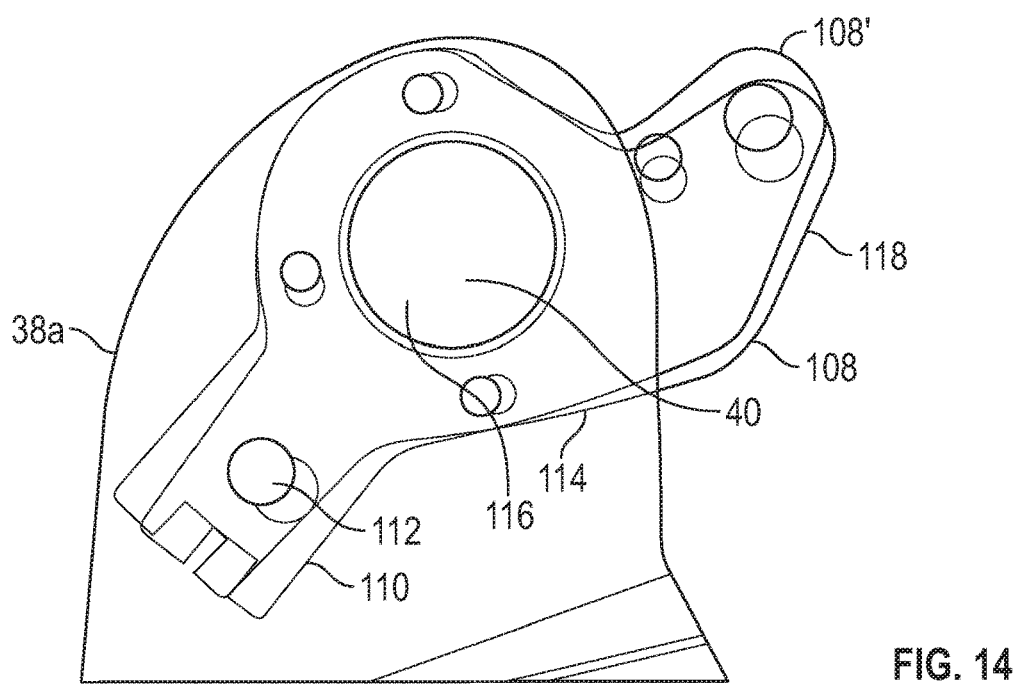
FIG. 14 is a right side view of the optional motion link driver of the armrest assembly of FIG. 12.

In certain instances, it is contemplated that the motion links 46a, 46b may not latch the corresponding third pins 50a, 50b in an even manner. That is, the motion link 46a may latch the third pin 50a in a manner more or less than the motion link 46b latches the third pin 50b, or vice versa. In these instances, it is contemplated that an additional mechanism can be implemented to facilitate an optimized engagement of the motion links 46a, 46b with the corresponding third pins 50a, 50b. Referring now to FIGS. 12-14, an optional motion link driver 108 is axially mounted over the shaft 40. Generally, the motion link driver 108 is configured as a stationary member and is further configured to engage the motion link 46a as the shaft 40 rotates thereby forcing corresponding rotation of the motion link 46a.

Referring again to FIGS. 12-14, the motion link driver 108 includes a first leg 110 having a first leg aperture 112, a central segment 114 extending from the first leg 110 and having a central segment aperture 116 and a second leg 118 extending from the central segment 114 in a direction opposite from the first leg 110. The second leg 118 includes a projection 120 extending in a direction generally perpendicular from the second leg 118.

Referring again to FIGS. 12-14, the central segment 114 is positioned such that the central segment aperture 116 receives the shaft 40. A diameter of the central segment aperture 116 is larger than a diameter of the shaft 40. Accordingly, the motion link driver 108 does not rotate as the shaft 40 rotates. The first leg 110 of the motion link driver 108 is attached to the floor bracket 38a using the first leg aperture 112 and suitable mounting hardware 122.

Referring now to FIGS. 12 and 14, the first leg aperture 112 has the form of a slot, thereby allowing adjustable rotation of the motion link driver 108. The rotation of the motion link driver 108 facilitates contact of the projection 120 with the lower portions 56a of the motion link 46a. In the illustrated embodiment, the adjustable rotation of the motion link driver 108 is in a range of from about 1° to about 10°. However, in other embodiments, the adjustable rotation of the motion link driver 108 can be more than 10°. The motion link driver 108 is shown in a first position and the motion link driver 108' is shown in an adjusted second position. It should be understood that the motion link driver could be adjusted to any intermediate position between the 108 and 108' positions.

Referring now to FIG. 12, the lower portions 56a of the motion link 46a can have a circumferential contour that, when engaged with the projection 120, forces a desired rotation of the motion link 46a as the motion link 46a rotates, thereby causing a desired and optimized engagement of the motion links 46a, 46b with the corresponding third pins 50a, 50b. In the illustrated embodiment, the lower portions 56a of the motion link 46a and the projection 120 each have an arcuate circumferential contour. However, it should be appreciated that in other embodiments, the lower portions 56a of the motion link 46a and the projection 120 can have other corresponding circumferential contours sufficient to force a desired rotation of the motion link 46a as the motion link 46a rotates, thereby causing a desired and optimized engagement of the motion links 46a, 46b with the corresponding third pins 50a, 50b. However, it should be appreciated that the motion link driver 108 is optional and not required for successful operation of the armrest assembly with self-leveling capability.

Referring now to FIG. 12, the lower portions 56a of the motion link 46a can have a circumferential contour that, when engaged with the projection 120, forces a desired rotation of the motion link 46a as the motion link 46a rotates, thereby causing a desired and optimized engagement of the motion links 46a, 46b with the corresponding third pins 50a, 50b. In the illustrated embodiment, the lower portions 56a of the motion link 46a and the projection 120 each have an arcuate circumferential contour. However, it should be appreciated that in other embodiments, the lower portions 56a of the motion link 46a and the projection 120 can have other corresponding circumferential contours sufficient to force a desired rotation of the motion link 46a as the motion link 46a rotates, thereby causing a desired and optimized engagement of the motion links 46a, 46b with the corresponding third pins 50a, 50b. However, it should be appreciated that the motion link driver 108 is optional and not required for successful operation of the armrest with self-leveling capability.

Figure 15A:
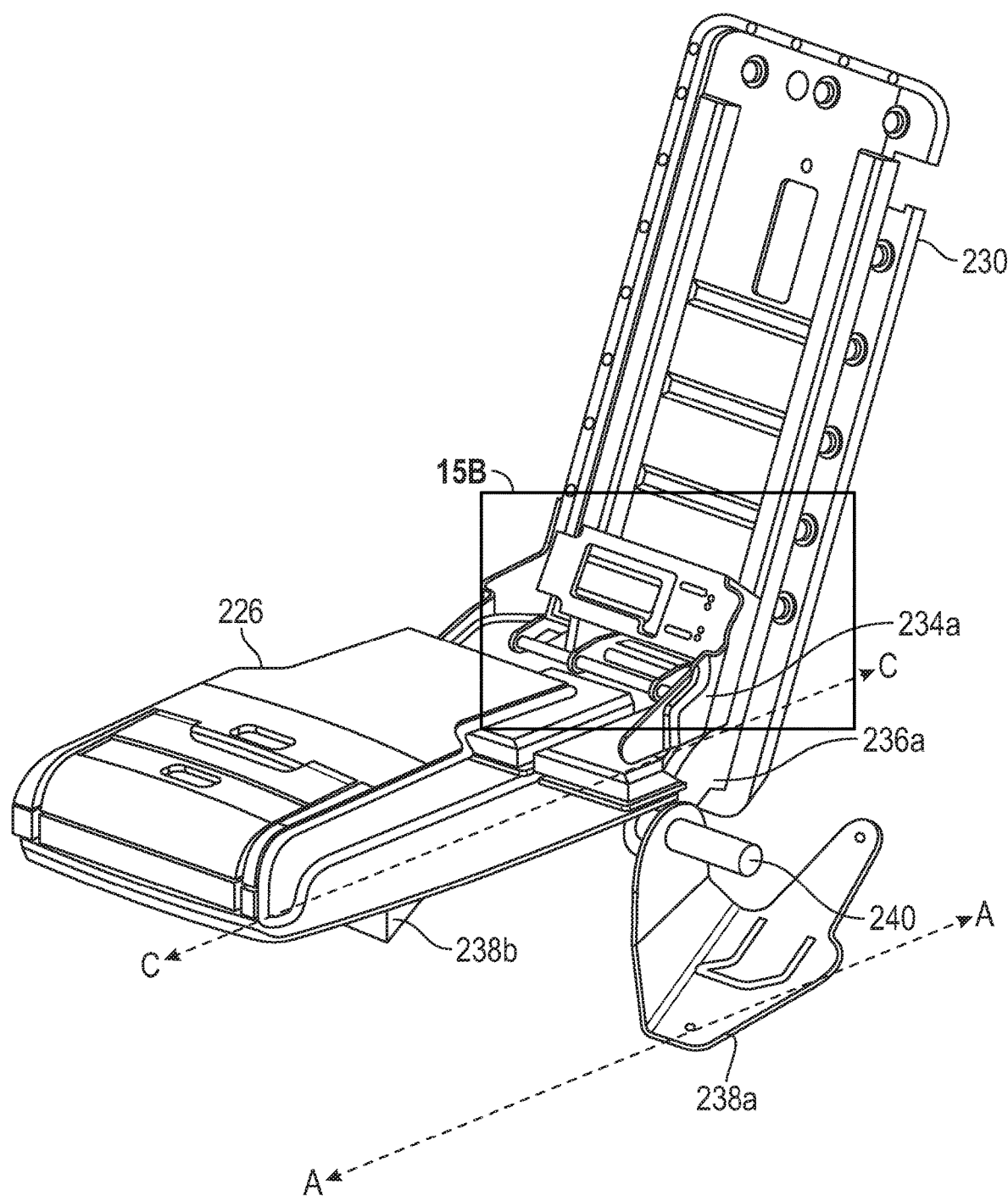
FIG. 15A is a perspective left side view of a second embodiment of an armrest assembly with self-leveling capability.
Figure 15B:
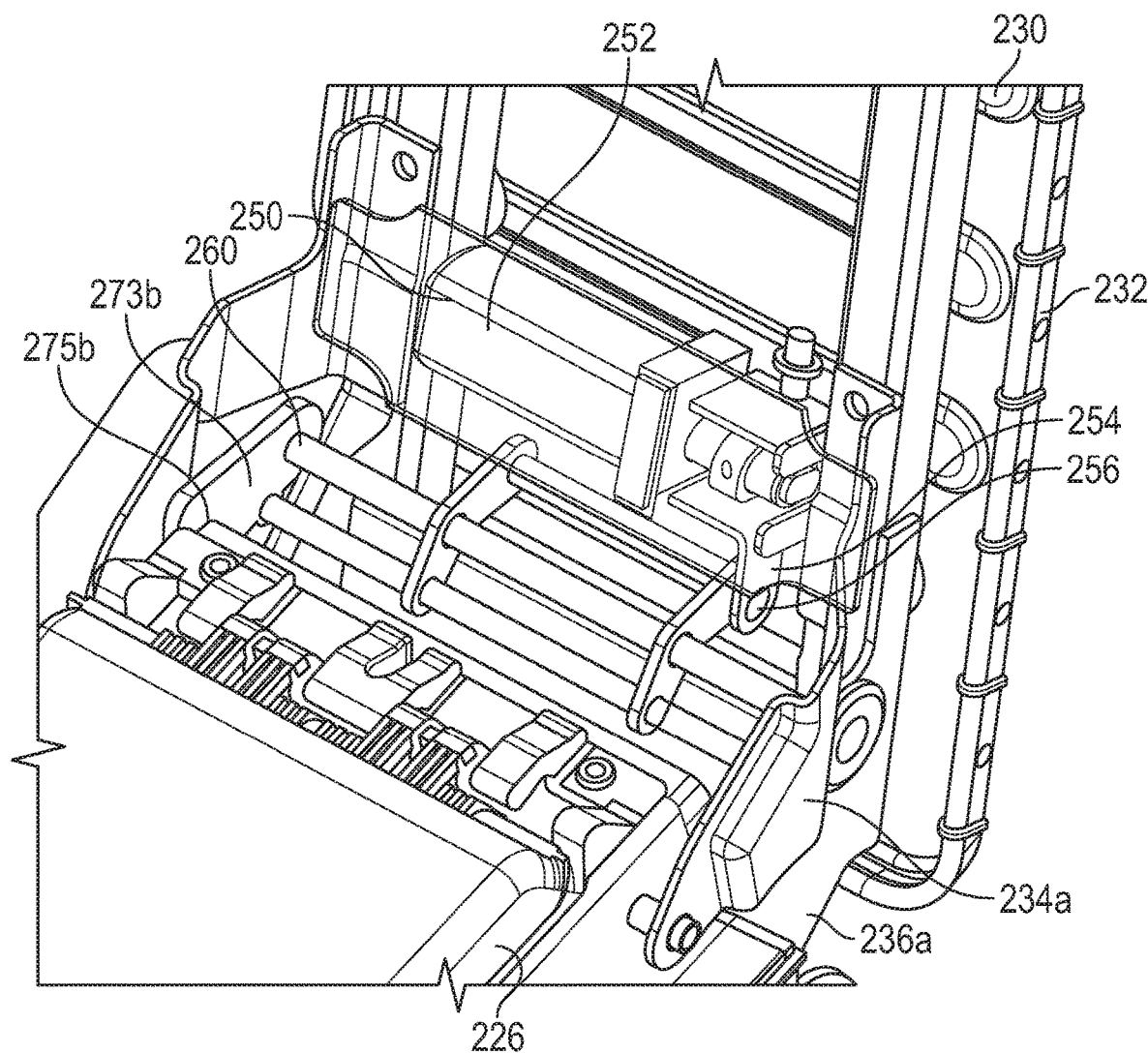
FIG. 15B is a perspective left side view of a portion of the armrest assembly with self-leveling capability of FIG. 15A.
Figure 15C:
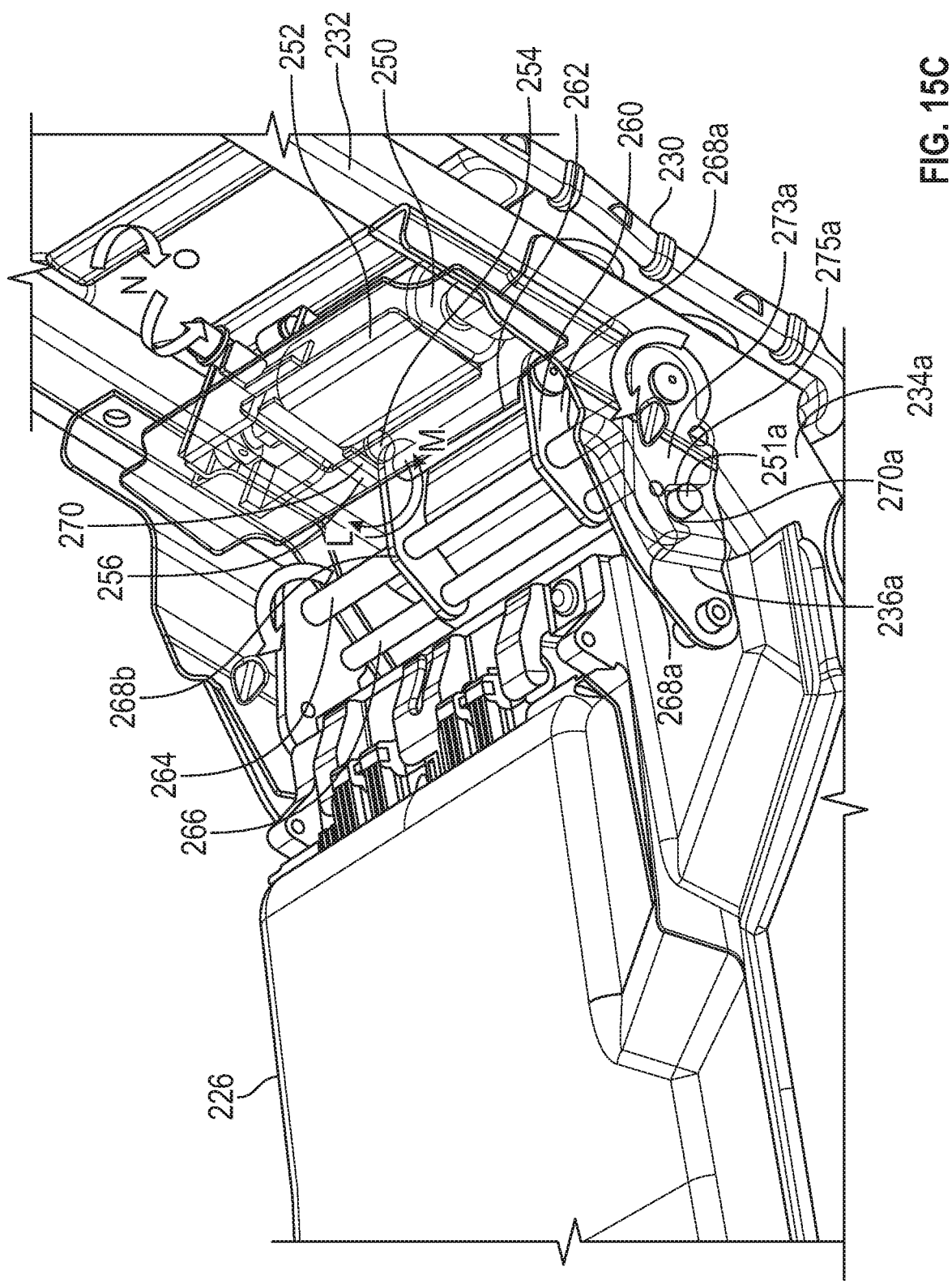
FIG. 15C is an enlarged perspective left side view of a portion of the armrest assembly with self-leveling capability of FIG. 15B.

While the embodiments illustrated in FIGS. 2-12 and described above involve the use of motion links 46a, 46b, it is contemplated that in other embodiments, other structures, mechanisms and devices can be used to provide an armrest assembly with self-leveling capability. Referring now to FIGS. 15A-15C, another embodiment of an armrest assembly with self-leveling capability is shown generally at 226. Generally, the armrest assembly 226 is linked to a squab 230 of a vehicle seat, such that rotation of the squab 230 from a first reclined orientation to a second reclined orientation causes rotation of the linkage, thereby maintaining the armrest assembly 226 in a substantially horizontal orientation.

Referring again to FIGS. 15A-15C, the armrest assembly 226 and the squab 230 are shown with the longitudinal axis C-C of the armrest assembly 226 in a substantially horizontal orientation relative to the horizontal line A-A and the squab 230 in the first reclined orientation. The squab 230 includes an internal frame 232, opposing first brackets 234a, 234b and opposing second brackets 236a, 236b (only one of the first and second brackets 234a, 236a is shown in FIGS. 15A-15C for purposes of clarity). The opposing first brackets 234a, 234b extend in a direction toward opposing floor brackets 238a, 238b.

Referring again to FIGS. 15A-15C, a shaft 240 is connected to the opposing first brackets 234a, 234b and is received by bearings (not shown for purposes of clarity) positioned in the opposing floor brackets 238a, 238b. In operation, the shaft 240 and the connected squab 230 are configured to rotate as a unit relative to the opposing floor brackets 238a, 238b in a clockwise direction and a counterclockwise direction. The opposing second brackets 236a, 236b will be discussed in more detail below.

Referring again to FIGS. 15A-15C, an actuator assembly 250 is attached to the internal frame 232 of the squab 230. The actuator assembly 250 includes a sensor (not shown) a driver 252 and an output shaft 254. The sensor is configured to sense movement of the squab 230 from one reclined orientation to another reclined orientation. The sensor is further configured for electrical communication with the driver 252, in a manner such as to provide signals to the driver 252. In operation, as the squab 230 rotates from one reclined orientation to another reclined orientation, the sensor detects the rotation and actuates the driver 252. In the illustrated embodiment, the sensor is an accelerometer. However, in other embodiments, the sensor can be other structures, mechanisms and devices sufficient to sense movement of the squab 230 from one reclined orientation to another reclined orientation and direct the driver 252.

Referring again to FIGS. 15A-15C, the driver 252 is configured to rotate the output shaft 254 upon receipt of actuation signals from the sensor. In the illustrated embodiment, the driver 252 is an electric motor. However, in other embodiments, the driver 252 can be other structures, mechanisms and devices sufficient to rotate the output shaft 254 upon receipt of actuation signals from the sensor. In certain embodiment, the actuator assembly 250 can includes a plurality of gears, bearing and shafts (not shown) configured to connect the output shaft 254 with the driver 252.

Referring now to FIG. 15C, the output shaft 232 includes a lead screw portion 256. The lead screw portion 256 is configured to selectively rotate both in a clockwise direction, as shown by direction arrow L and a counterclockwise direction M, as the output shaft 232 is rotated by the driver 252 in a clockwise direction as shown by direction arrow N and a counterclockwise direction θ. The lead screw portion 256 is configured to engage a rocker assembly 260 in a manner such that rotation of the lead screw portion 256 results in rotation of the rocker assembly 260.

Referring again to FIG. 15C, the rocker assembly 260 includes a first shaft 262, a second shaft 264 and a third shaft 266. The first, second and third shafts 262, 264 and 266 are arranged in a substantially orientation and connected to support plates 268a, 268b. The support plates 268a, 268b are configured to maintain the first, second and third shafts 262, 264 and 266 in their illustrated relative positions as the rocker assembly 260 rotates.

Referring again to FIG. 15C, the first shaft 262 includes a follower portion 270. The follower portion 270 includes an aperture with an internal thread (not shown) that engages the lead screw portion 256 of the output shaft 232 in a manner such that rotation of the lead screw portion 256 translates to movement of the follower portion 270 along the lead screw portion 256 and movement of the first shaft 262. The direction of the movement of the follower portion 270 depends on the rotational direction of the lead screw portion 256. For example, clockwise rotation of the lead screw portion 256 can result in movement of the follower portion 270 in a direction toward the driver 252 and counterclockwise rotation of the lead screw portion 256 can result in movement of the follower portion 270 in a direction away from the driver 252. The follower 270 can have any desired structure including the non-limiting examples of a threaded aperture or a threaded nut.

Referring again to FIG. 15C, the opposing ends of the second shaft 264 are connected to the rotational link plates 272a, 272b in a manner such that rotation of the second shaft 264 results in rotation of the rotational link plates 272a, 272b. The second shaft 264 is pivotally supported by the internal frame 232 of the squab 230 such that the actuator assembly 250 is rotatable about the second shaft 264. The third shaft is connected to the support plates 268a, 268b and is further connected to the rotational link plates 272a, 272b.

Referring again to FIG. 15C, the rotational link plates 272a, 272b include an arcuate segment 273a, 273b. The arcuate segments 273a, 273b forms recesses 275a, 275b therein. In the embodiment shown in FIG. 15C, the recess 275a has the cross-sectional shape of a "C", with the opening of the "C" facing in a generally downward direction. The recess 275a, formed by the arcuate segment 273a of the rotational link plates 272a is configured to receive a third pin 251a extending from the armrest assembly 226 as the armrest assembly 226 rotates.

Figure 16:
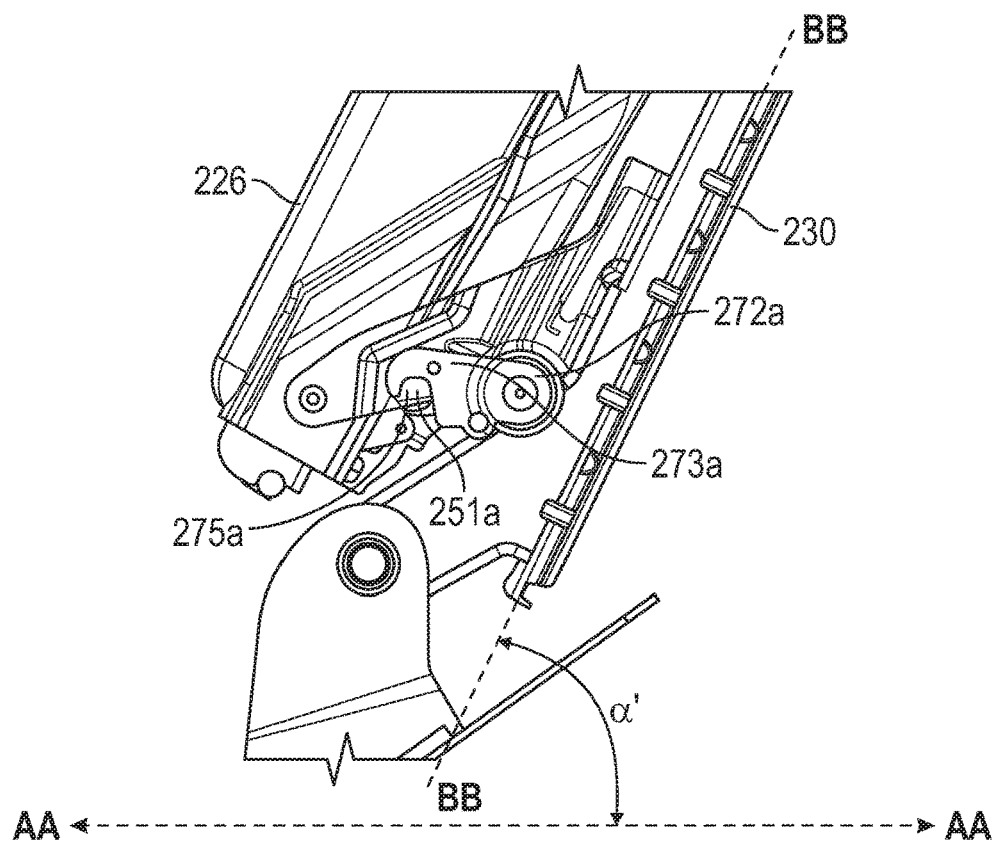
FIG. 16 is a left side view of the armrest assembly with self-leveling capability of FIG. 15A, illustrating the armrest assembly in a stowed orientation and the squab in a first reclined orientation.

Referring now to FIGS. 16-19, operation of the armrest assembly with self-leveling capability 226 will now be described. Referring first to FIG. 16, the armrest assembly 226 and the squab 230 are shown with the armrest assembly 226 in a stowed orientation and the squab 230 in a first reclined orientation. The term "first reclined orientation", as used herein, is defined to mean a longitudinal axis BB-BB of the squab 230 forms a first acute angle α' with the horizontal line AA-AA. In the illustrated embodiment, the first acute angle α' is the same as the first acute angle α illustrated in FIG. 2 and described above. However, it should be understood that the first acute angle α' can be different from the first acute angle α With the armrest assembly 226 and the squab 230 in these relative positions, the arcuate segments 273a, 273b and the recesses 275a, 275b of the rotational link plates 272a, 272b are spaced apart from the third pins 251a, 251b of the armrest assembly 226.

Figure 17:
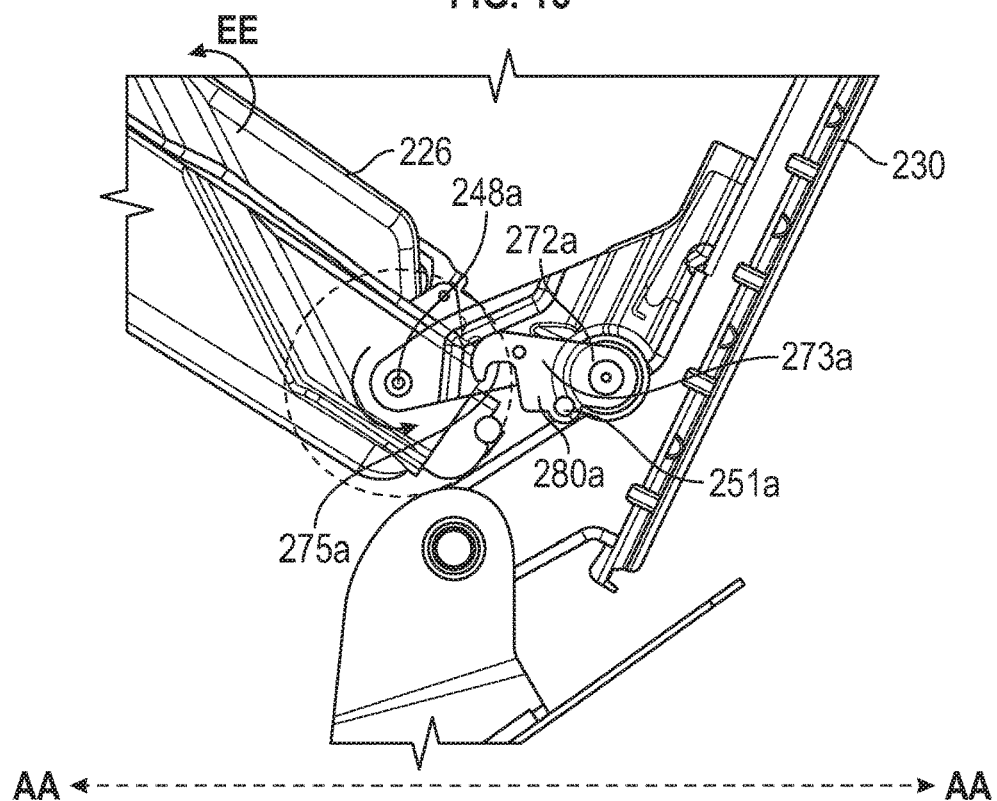
FIG. 17 is a left side view of the armrest assembly with self-leveling capability of FIG. 15A, illustrating the armrest assembly rotating in a direction toward a horizontal orientation and the squab in a first reclined orientation.

Referring now to FIG. 17, the squab 230 remains in a first reclined orientation relative to horizontal line AA-AA and the armrest assembly 226 is rotated in a forward direction about the second pin 248a, as indicated by direction arrow EE. As the armrest assembly 226 is rotated in the forward direction, the third pin 251a of the armrest assembly 226 contacts a guide segment 280a of the rotational link plates 272a. The guide segment 280a is configured to direct the travel of the third pin 251a in a direction toward the arcuate segment 273a rotational link plates 272a. As the third pin 251a contacts the guide segment 280a, the engagement of the follower portion 270 of the rocker assembly 260 with the lead screw portion 256 of the actuator assembly 250 provides resistance against rotation of the rotational link plates 272a.

Figure 18:
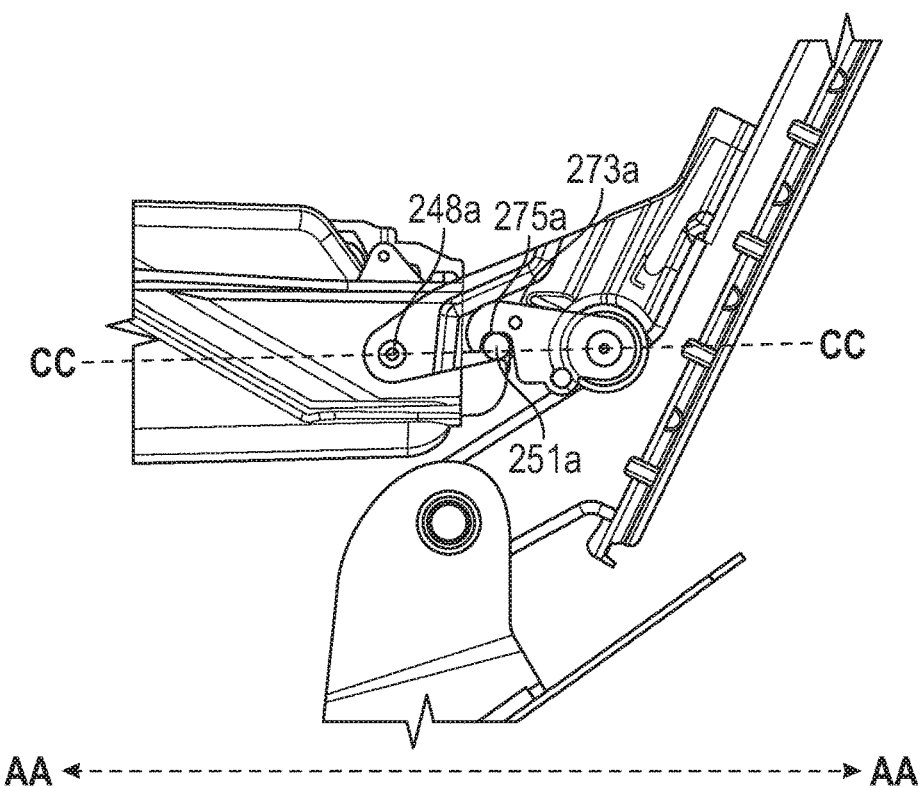
FIG. 18 is a left side view of the armrest assembly with self-leveling capability of FIG. 15A, illustrating the armrest assembly in a horizontal orientation and the squab in a first reclined orientation.

Referring now to FIG. 18, the squab 230 remains in a first reclined orientation relative to horizontal line AA-AA and the armrest assembly 226 is rotated in a forward direction about the second pin 248a to a substantially horizontal orientation as the engagement of the follower portion 270 of the rocker assembly 260 with the lead screw portion 256 of the actuator assembly 250 resistance against rotation of the rotational link plates 272a. The term "substantially horizontal orientation", as used herein, as defined to mean a longitudinal axis CC-CC of the armrest assembly 226 is substantially parallel to the horizontal line AA-AA. In the substantially horizontal position, the third pin 251a of the armrest assembly 226 seats within the recess 275a formed by the arcuate segment 273a of the rotational link plates 272a. In this manner, the third pin 251a and the rotational link plates 272a cooperate to allow the armrest assembly 226 to rotate to the substantially horizontal orientation and further cooperate to maintain the armrest assembly 226 in the horizontal orientation.

Figure 19:
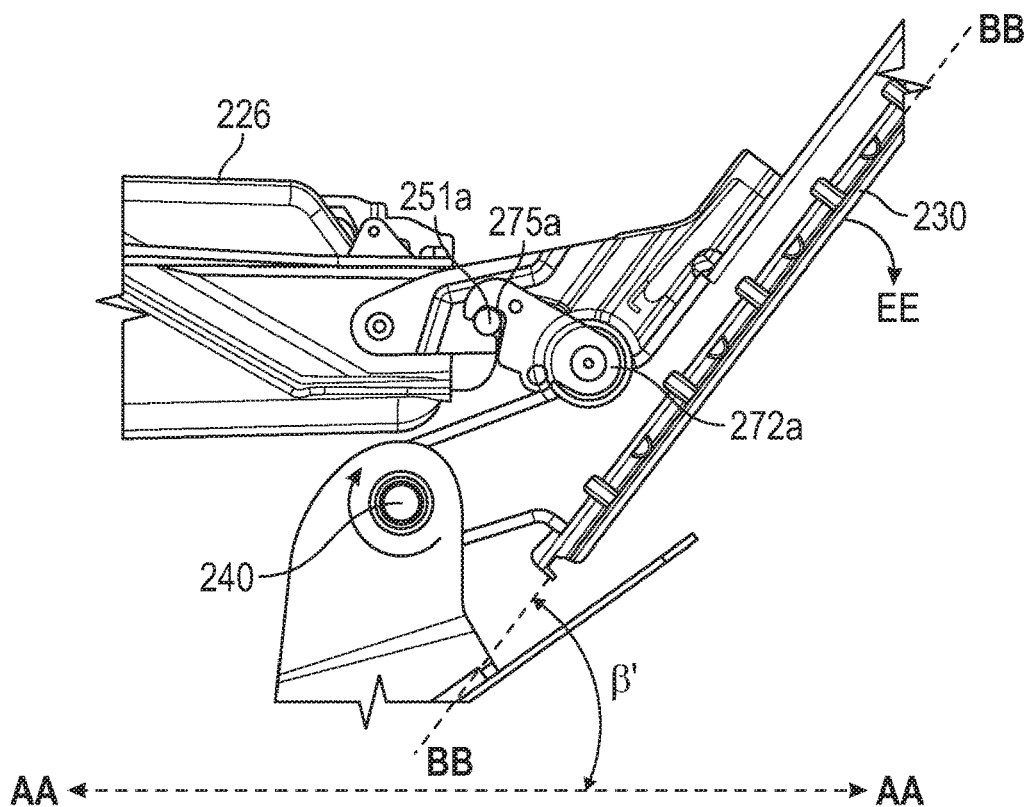
FIG. 19 is a left side view of the armrest assembly with self-leveling capability of FIG. 15A, illustrating the armrest assembly in a horizontal orientation and the squab in a second reclined orientation.

While the embodiments shown in FIGS. 16-18 show the squab 230 in a first reclined orientation, it is contemplated that the rotational link plates 272a, 272b can be used to maintain the armrest assembly 226 in the substantially horizontal orientation with the squab 230 in other reclined orientations. Referring now to FIG. 19, the squab 230 is shown after rotation on the shaft 240 (as shown by direction arrow EE) to a second reclined orientation. In the second reclined orientation, the longitudinal axis BB-BB of the squab 230 forms a second acute angle β' with the horizontal line AA-AA. In the illustrated embodiment, the second acute angle β' is less than the first acute angle α' and in a range of from about 45° to about 60°. However, in other embodiments, the second acute angle β' can be less than about 45° or more than about 60°.

Referring now to FIGS. 15C and 19, as the squab 230 rotates on the shaft 240 in direction E, the third pin 251a remains seated in the recess 275a formed by the arcuate segment 273a of the rotational link plates 272a. The sensor of the actuator assembly 250 senses the rotation of the squab 230 and directs the actuator assembly 250 to rotate the output shaft 254. Rotation of the output shaft 254 forces rotation of the lead screw portion 256, which in turn causes movement of the follower portion 270 a length along the lead screw portion. Movement of the follower portion 270 causes rotation of the rocker assembly 260 about the second shaft 264. Rotation of the rocker assembly 260 about the second shaft 264 in turn causes arcuate movement of the third shaft 266, which in turn causes rotation of the rotational link plates 272a. Rotation of the rotational link plates 272a, 272b advantageously allows arcuate movement of the third pins 251a. In this manner, the third pin 251a and the rotational link plates 272a, 272b cooperate to allow the squab 230 to rotate to the second reclined orientation with the armrest assembly 226 maintaining the substantially horizontal orientation.

Figure 20:
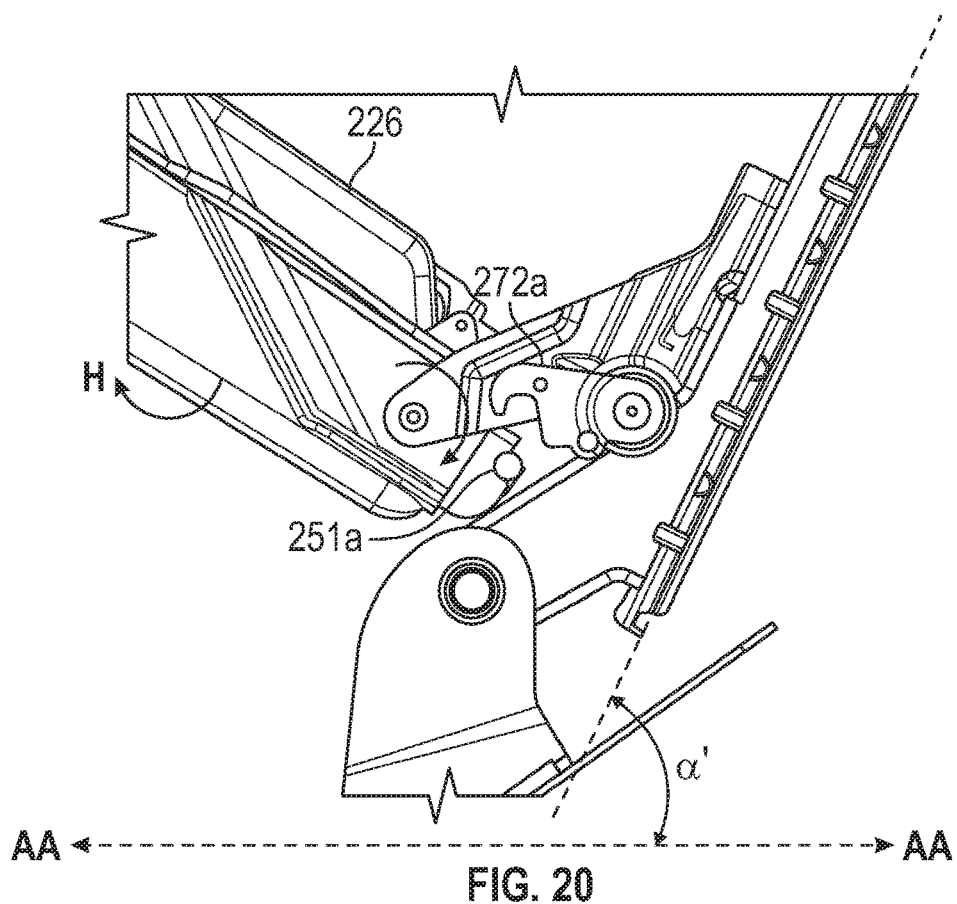
FIG. 20 is a left side view of the armrest assembly with self-leveling capability of FIG. 15A, illustrating the armrest assembly disengaging with the motion link and the squab in a first reclined orientation.
Figure 21:
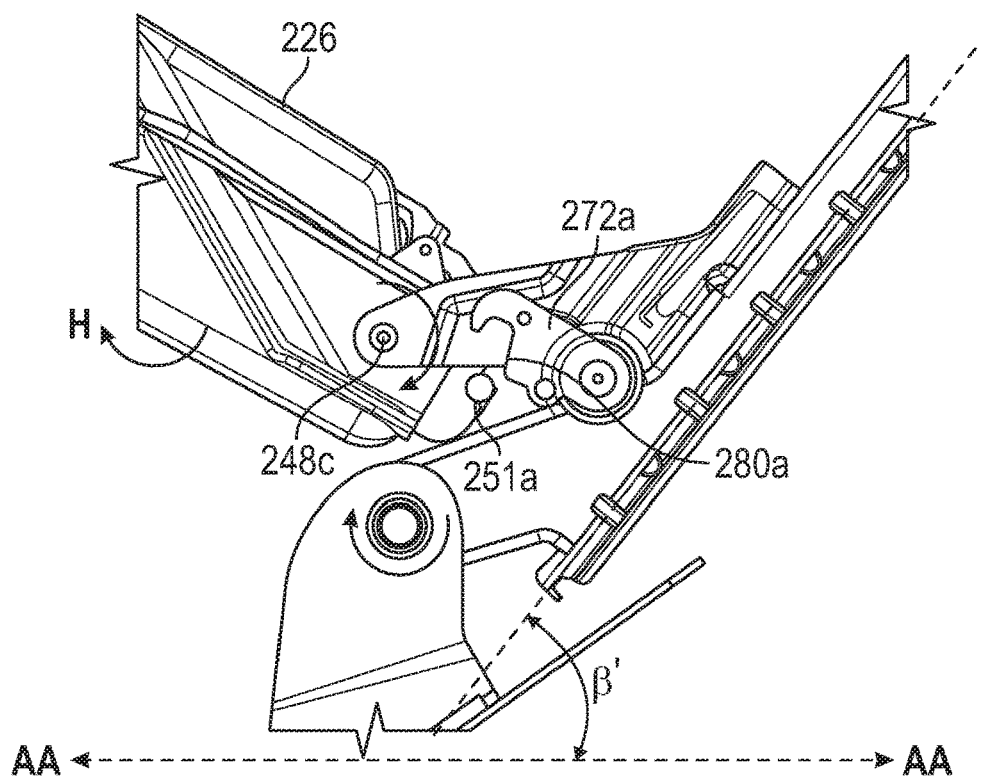
FIG. 21 is a left side view of the armrest assembly with self-leveling capability of FIG. 15A, illustrating the armrest assembly disengaging with the motion link and the squab in a second reclined orientation.

Referring now to FIGS. 20 and 21, the armrest assembly 226 can be returned to a stowed orientation by disengagement from the rotational link plates 272a, 272b of the rocker assembly 260 with the squab 230 either in the first reclined orientation, as shown by FIG. 20, or with the squab 230 in the second reclined orientation, a shown by FIG. 21. Disengagement of the armrest assembly 226 from the rotational link plates 272a, 272b is accomplished by clockwise rotation of the armrest assembly 226, as indicated by direction arrow H, about the second pin 248a. As the armrest assembly 226 is rotated, the third pin 251a is guided by the guide segment 280a of the rotational link plates 272a. As the armrest assembly 226 continues to rotate in the clockwise direction, the engagement of the follower portion 270 of the rocker assembly 260 with the lead screw portion 256 of the actuator assembly 250 provides resistance against rotation of the rotational link plates 272a. Continued rotation of the armrest assembly 226 separates the third pin 251a from the rotational link plates 272a, thereby allowing the armrest assembly 226 to rotate to the stowed position as shown in FIG. 16.

Figure 22:
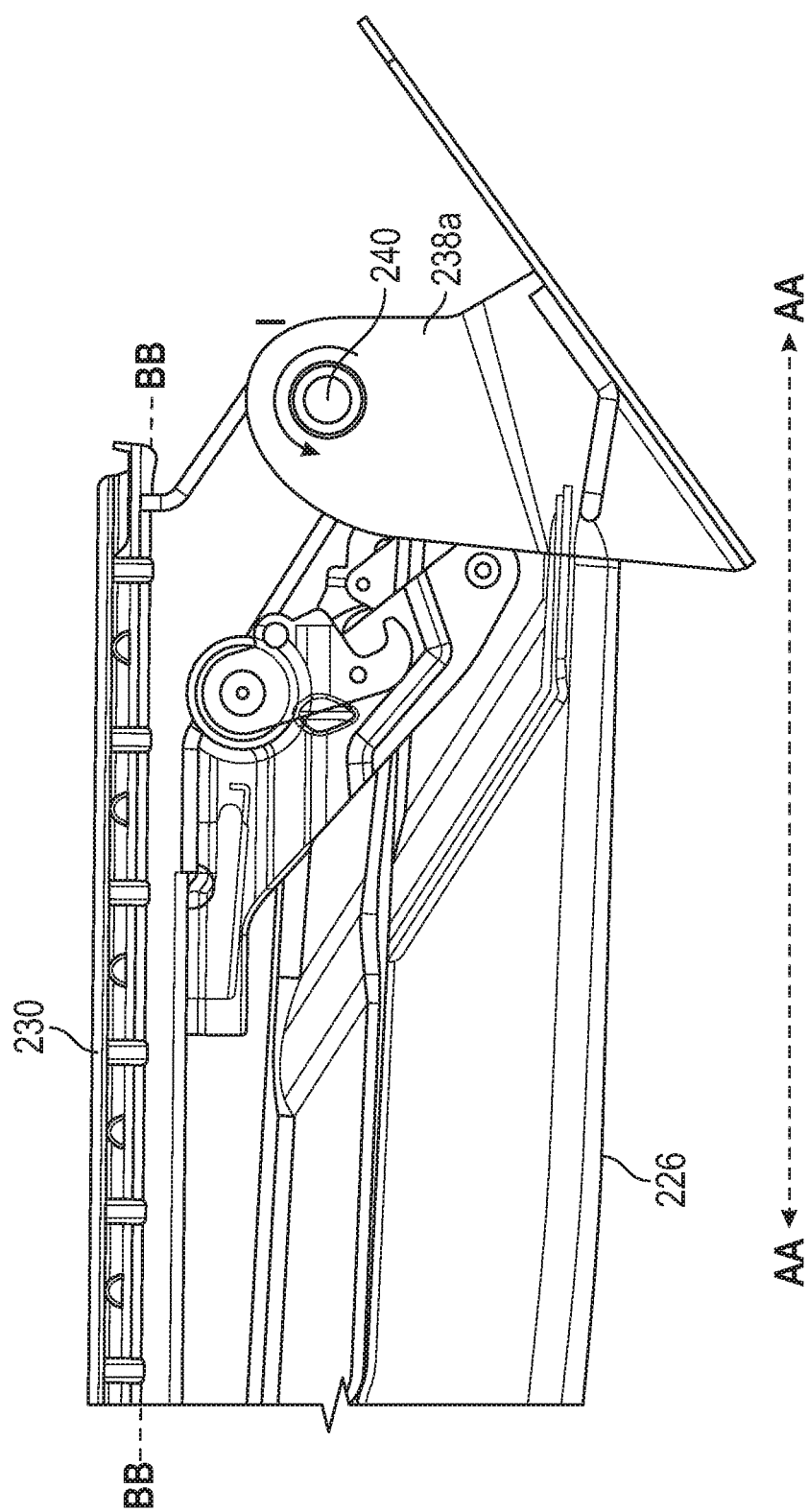
FIG. 22 is a left side view of the armrest assembly with self-leveling capability of FIG. 15A, illustrating the armrest assembly and the squab in a fold flat orientation.

While the embodiments shown in FIGS. 15A-15C and 16-21 illustrate the squab 230 in a reclined orientation, it is contemplated that the armrest assembly 226 and the squab 230 can be rotated to a forward, fold flat orientation. Referring now to FIG. 22, rotation of the armrest assembly 226 and the squab 230 to the fold flat orientation is illustrated. The term "fold flat orientation", as used herein, is defined to mean the longitudinal axis BB-BB of the squab 230 is substantially parallel with the horizontal line AA-AA. In the fold flat orientation, the armrest assembly 226 and the squab 230 are nested together following rotation in a counterclockwise direction, as indicated by direction arrow I, about the shaft 240 extending through the floor brackets 38a, 38b. The rotational link plates 272a, 272b are disengaged from the armrest assembly 226.

The principle and mode of operation of the armrest assembly with self-leveling capability have been explained and illustrated in certain embodiments. However, it must be understood that the armrest assembly with self-leveling capability may be practiced otherwise than as specifically explained and illustrated without departing from its spirit or scope.

What is claimed is:

1. A portion of a seat comprising:
   a floor bracket;
   a back portion having a first bracket and a second bracket, the first bracket being supported on the floor bracket for allowing movement of the back portion relative thereto;
   an armrest assembly supported on the second bracket for allowing movement of the armrest assembly relative thereto between a deployed orientation and a stowed orientation, the armrest assembly including a pin; and
   a motion link including a first portion that is connected to the first bracket and a second portion including a recess that receives the pin to releasably connect the second portion of the motion link to the armrest assembly,
   wherein when the back portion is moved from a first position to a second position, the motion link is arranged and configured to maintain the armrest assembly substantially in the deployed orientation.

2. The portion of the seat defined in claim 1 wherein the first portion of the motion link is rotatably connected to the first bracket.

3. The portion of the seat defined in claim 1 further including a link spring that reacts between the first bracket and the motion link.

4. A portion of a seat comprising:
   a floor bracket;
   a back portion having a first bracket and a second bracket, the first bracket being supported on the floor bracket for allowing movement of the back portion, the first bracket, and the second bracket relative to the floor bracket;
   an armrest assembly supported on the second bracket for allowing movement of the armrest assembly relative to the seat back, the first bracket, and the second bracket between a deployed orientation relative to the floor bracket and a stowed orientation relative to the floor bracket, the armrest assembly including a pin; and
   a motion link including a first portion that is connected to the first bracket and a second portion including a recess that receives the pin to releasably connect to the armrest assembly,
   wherein when the back portion is moved from a first position relative to the floor bracket to a second position relative to the floor bracket, the motion link is arranged and configured to maintain the armrest assembly substantially in the deployed orientation relative to the floor bracket.

5. The portion of the seat defined in claim 4 wherein the first portion of the motion link is rotatably connected to the first bracket.

6. The portion of the seat defined in claim 4 further including a link spring that reacts between the first bracket and the motion link.

* * * * *